(12) United States Patent
McCullough et al.

(10) Patent No.: US 10,262,296 B2
(45) Date of Patent: *Apr. 16, 2019

(54) INVENTORY MANAGEMENT SYSTEM AND METHOD

(71) Applicant: RAM HEALTHCARE GROUP, INC., Fort Wayne, IN (US)

(72) Inventors: Michael T. McCullough, Fort Meyers, FL (US); Thomas W. Higginbotham, Fort Wayne, IN (US); James Robert Camire, Westminster, CO (US); Thomas Edward Hennel, South Bend, IN (US)

(73) Assignee: RAM HEALTHCARE GROUP, INC., Fort Wayne, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/023,416

(22) Filed: Jun. 29, 2018

(65) Prior Publication Data

US 2018/0308044 A1    Oct. 25, 2018

Related U.S. Application Data

(63) Continuation of application No. 15/295,572, filed on Oct. 17, 2016, now Pat. No. 10,013,669, which is a
(Continued)

(51) Int. Cl.
*G06F 19/00* (2018.01)
*G06Q 30/00* (2012.01)
(Continued)

(52) U.S. Cl.
CPC ....... *G06Q 10/087* (2013.01); *G06K 7/10881* (2013.01); *G06K 7/1413* (2013.01); *G06K 19/06028* (2013.01)

(58) Field of Classification Search
CPC ......... G06F 19/00; G06F 17/00; G06Q 30/00; G06Q 90/00; G06K 19/00
(Continued)

(56) References Cited

U.S. PATENT DOCUMENTS 7,268,684 B2    9/2007   Tethrake et al.
7,693,757 B2    4/2010   Zimmerman
(Continued)

OTHER PUBLICATIONS

International Search Report and Written Opinion of the International Searching Authority issued in PCT Application No. PCT/US2015/026309 dated Jul. 2015.
(Continued)

*Primary Examiner* — Edwyn Labaze
(74) *Attorney, Agent, or Firm* — Heslin Rothenberg Farley & Mesiti P.C.

(57) ABSTRACT

A method, system, and computer program product are provided to manage inventory. The method includes: obtaining, by a processor, a signal of decodable indicia; decoding, by the processor, the signal of decodable indicia to access decoded data, where the decoded data includes information identifying an object, where the object includes a plurality of items. Based on the information identifying the object, the processor obtains, from a memory, a visual representation of a portion of the object. The visual representation is divided into a plurality of regions and each region represents an item of the plurality of items. The processor displays the visual representation on a client and obtains a designation of at least one of the plurality of regions. Based on obtaining the designation the processor generates an order request for an item represented by the at least one of the plurality of regions.

17 Claims, 32 Drawing Sheets

Related U.S. Application Data continuation of application No. PCT/US2015/026309, filed on Apr. 17, 2015.

(60) Provisional application No. 62/042,934, filed on Aug. 28, 2014, provisional application No. 61/981,498, filed on Apr. 18, 2014.

(51) Int. Cl.
*G06Q 90/00* (2006.01)
*G06Q 10/08* (2012.01)
*G06K 7/10* (2006.01)
*G06K 7/14* (2006.01)
*G06K 19/06* (2006.01)

(58) Field of Classification Search
USPC ........................................ 235/385, 375, 487
See application file for complete search history.

(56) References Cited

U.S. PATENT DOCUMENTS

| | | |
|---|---|---|
| 8,342,400 B1 | 1/2013 | Reese et al. |
| 8,469,275 B2 | 6/2013 | Dahari |
| 2002/0156692 A1 | 10/2002 | Squeglia et al. |
| 2003/0105552 A1 | 6/2003 | Lunak et al. |
| 2010/0046791 A1 | 2/2010 | Glickman et al. |
| 2013/0035950 A1 | 2/2013 | MacDonald et al. |
| 2014/0003727 A1 | 1/2014 | Lortz et al. |
| 2014/0291397 A1 | 10/2014 | Caputo et al. |
| 2015/0001293 A1 | 1/2015 | Vargas et al. |
| 2016/0350706 A1 | 12/2016 | Endries et al. |
| 2016/0364686 A1 | 12/2016 | Wolfe et al. |
| 2017/0098049 A1 | 4/2017 | Sweeney et al. |
| 2017/0132460 A1 | 5/2017 | Curlander et al. |

OTHER PUBLICATIONS

Extended European Search Report issued in European Patent Application No. 15779432.2 dated Aug. 8, 2017.

FIG. 20

Manufacturer Inventory Management

RAM Analytics Engine — RAM Healthcare Group Inc — Print — Search

| Products | Events | Providers | OEM | Advance Analytics | Returns | Administration | Dashboard |

April 19, 2014    Export

Timeframe: Last 30 Days
Provider: Acadian Med Ctr
Location: Eunice
Product: Hips
Family: All
Subfamily: All
SKU: All    Submit
SKU:    Submit

| Product | Family | Subfamily | SKU | Serial/Lot | Expiry | Qty | Cost | Last Event |
|---|---|---|---|---|---|---|---|---|
| Hips | Stems | BC | 1234567 | E4567D | Mar-14 | 2 | $484.78 | 3/24/13 22:00 |
| Hips | Stems | BD | 1238024 | E6789K | Jun-14 | 3 | $797.34 | 3/31/13 1:00 |
| Hips | Stems | BE | 1241481 | R4567J | Oct-14 | 4 | $1157.08 | 3/28/13 7:00 |
| Hips | Stems | BF | 1244533 | D4567K | Feb-15 | 2 | $625.52 | 3/21/13 18:00 |
| Hips | Stems | BG | 1248395 | S3456H | Jun-15 | 5 | $1681.25 | 3/31/13 5:00 |
| Hips | Cups | ASD | 32567098 | 23423 | Oct-15 | 6 | $812.70 | 3/31/13 13:00 |
| Hips | Cups | ASD | 32567095 | 23876 | Feb-16 | 3 | $475.98 | 3/30/13 14:00 |
| Hips | Cups | ASD | 32567096 | 24875 | Jun-16 | 4 | $727.48 | 4/2/13 14:00 |
| Hips | Cups | ASD | 32567098 | 25435 | Oct-16 | 7 | $1435.56 | 3/18/13 2:00 |
| Hips | Heads | DKLF | 345780 | AF567 | Feb-17 | 4 | $913.16 | 3/31/13 14:00 |
| Hips | Heads | DKLF | 345782 | RF456 | Jun-17 | 3 | $754.50 | 3/31/13 0:00 |
| Hips | Heads | DKLF | 345786 | AG566 | Oct-17 | 8 | $2197.68 | 3/31/13 9:00 |
| Hips | Heads | DKLF | 345784 | DT543 | Feb-18 | 4 | $1191.68 | 4/2/13 2:00 |

Breakdown of Dollars Consigned
Pins: 1.4%
Blades: 1.3%
Cement: 4.7%
Heads: 6.2%
Stems: 9.9%
Patellic: 3.5%
Liners: 6.3%
Trays: 11.8%
Femorels: 13.3%
Liners: 6.7%
Heads: 9.3%
Cups: 11.1%
Stems: 14.5%

☐ Hips ☐ Knees ☐ Shoulders ☐ Other ☐ Stems
△ 1/4 ▽

Dollars Consigned
☐ Other ☐ Shoulders ☐ Knees ☐ Hips
$64449 — $71491 — $59746 — $71371 — $84000
Dec '12  Jan '13  Feb '13  Mar '13  Today Consigned Units
☐ Other ☐ Shoulders ☐ Knees ☐ Hips
252  277  268  264  270
Dec '12  Jan '13  Feb '13  Mar '13  Today 3201 Stelhorn Rd, Fort Wayne, IN 46815

Home | Contact Us | About the RAM Group | Privacy Policy | Terms and Conditions Warranty | Media Inquiries | Important Safety Information | Site Map | Logout

| Products | Events | Providers | OEM | Advance Analytics | Returns | Administration | Dashboard |

Manufacturer Stock Information

Region: Midwest    Territory: 542    Subterritory: 14    Facility: Acaida Med Ctr [Submit]    April 19, 2014    [Export]

| Product | Family | Subfamily | Sku | Serial/Lot | Expiry | Expiry | Cost | Last Event |
|---|---|---|---|---|---|---|---|---|
| Hips | Stems | BC | 1234567 | E4567D | Mar-14 | 2 | $484.78 | 3/24/13 22:00 |
| Hips | Stems | BD | 1238024 | E6789K | Jun-14 | 3 | $797.34 | 3/31/13 1:00 |
| Hips | Stems | BE | 1241481 | R4567J | Oct-14 | 4 | $1,157.08 | 3/28/13 7:00 |
| Hips | Stems | BF | 1244938 | D4567K | Feb-15 | 2 | $625.52 | 3/21/13 18:00 |
| Hips | Stems | DG | 1248395 | 53456H | Jun-15 | 5 | $1,681.25 | 3/31/13 5:00 |
| Hips | Cups | ASD | 31567098 | 23123 | Oct-15 | 6 | $812.70 | 3/31/13 13:00 |
| Hips | Cups | ASD | 34567055 | 23876 | Feb-16 | 3 | $475.98 | 3/30/13 14:00 |
| Hips | Cups | ASD | 34567096 | 24876 | Jun-16 | 4 | $727.48 | 4/2/13 14:00 |
| Hips | Cups | ASD | 34567098 | 25435 | Oct-16 | 7 | $1,435.56 | 3/18/13 2:00 |
| Hips | Heads | DKLF | 346780 | RF567 | Feb-17 | 4 | $913.15 | 3/31/13 14:00 |
| Hips | Heads | DKLF | 346782 | RF456 | Jun-17 | 3 | $754.50 | 3/31/13 0:00 |
| Hips | Heads | DKLF | 346786 | RG666 | Oct-17 | 8 | $2,197.68 | 3/31/13 9:00 |
| Hips | Heads | DKLF | 346784 | DT543 | Feb-18 | 4 | $1,191.68 | 4/2/13 2:00 |

SKU: 198547652    Serial/Lot: [Submit]

| Location | Address | Address2 | City, State | Qty | Last Event |
|---|---|---|---|---|---|
| ABBEVILLE GENERAL HOSPITAL | 118 NORTH HOSPITAL DRIVE | | ABBEVILLE, LA | 6 | 3/28/13, 20:00 |
| ABBOTT NORTHWESTERN HOSP | 2800 10TH AVENUE | | MINNEAPOLIS, MN | 4 | 4/2/13, 3:00 |
| ABILENE REGIONAL MEDICAL CE... | 6250 HIGHWAY 83/84 | SUIT 1000 | ABILENE, TX | 2 | 3/24/13, 22:00 |
| ABRAHAM LINCOLN MEM HOSP | 200 STAHLHUT DR. | | LINCOLN, IL | 6 | 4/1/13, 1:00 |
| ACADIAN MED CTR | 3501 HIGHWAY 190 EAST | | EUNICE, LA | 5 | 3/31/13, 7:00 |
| ADV SLRG CTR OF NORTHERN LA | 1601 LOUISVILLE AVE | | MONROE, LA | 2 | 3/30/13, 18:00 |
| ADVANCED AMBULATORY SURG... | 2333 NORTH HARLEM AVENUE | | CHICAGO, IL | 5 | 4/2/13, 5:00 |
| ADVANCED SURG CTR BETHESDA | 6430 ROCKLEDGE DR. STE 160 | | BETHESDA, MD | 3 | 3/24/13, 13:00 |
| ADVENTIST BOLINGBROOK HOS... | 355 REMINGTON BLVD | | BOLINGBROOK, IL | 5 | 3/31/13, 14:00 |
| ADVOCATE BROMENN MED CTR | 1304 FRANKLIN AVE | | NORMAL, IL | 6 | 3/28/13, 14:00 |
| ADVOCATE CONDELL MED CTR-MA | 13801 S MILWAUKEE AVE | | LIBERTYVILLE, IL | 5 | 3/21/13, 2:00 |
| ADVOCATE GOOD SAM HOSP-55 | 3815 HIGHLAND AVE | | DOWNERS GROVE, IL | 5 | 3/31/13, 14:00 |
| ADVOCATE GOOD SHEPHERD H... | 450 W ILLINOIS ROUTE 22 | | BARRINGTON, IL | 5 | 3/31/13, 0:00 |

3201 Stelhorn Rd, Fort Wayne, IN 46815

FIG. 21

| RAM Analytics Engine | | | RAM Healthcare Group Inc | | | ☐ Print | | Search |
|---|---|---|---|---|---|---|---|---|
| Products | Events | Providers | OEM | Advance Analytics | Returns | Administration | | Dashboard |

Provider Stock Report

April 19, 2014    Export

| OEM | Product | Family | Subfamily | Sku | Serial/Lot | Quantity | List Price |
|---|---|---|---|---|---|---|---|
| OEM3 | Hips | Heads | DKLF | 346780 | RF567 | 2 | $1,252.00 |
| OEM3 | Hips | Heads | DKLF | 146782 | Y8008B | 2 | $1,239.00 |
| OEM3 | Hips | Heads | DKLF | 346784 | Y8034D | 2 | $1,249.00 |
| OEM3 | Hips | Heads | DKLF | 346786 | V92323 | 2 | $1,260.00 |
| OEM3 | Hips | Heads | DKLF | 346788 | W9226C | 2 | $1,247.00 |
| OEM3 | Hips | Heads | DKLF | 346790 | 43ED7H | 2 | $1,257.00 |

PFSS INQUIRY

| Location | Address | Address2 | City, State | | Quantity | Last Event |
|---|---|---|---|---|---|---|
| ADVOCATE BROMENN MED CTR | 1304 FRANKLIN AVE | | NORMAL, IL | | 1 | 3/18/13 10:33 |
| ADVOCATE CONDELL MED CTR | 8015 MILWAUKEE AVE | | LIBERTYVILLE, IL | | 2 | 3/21/13 16:19 |
| ADVOCATE GOOD SAM HOSP | 1019 HIGHLAND AVE | | DOWNERS GROVE, IL | | 2 | 3/24/13 8:26 |
| ADVOCATE GOOD SAM HOSP | 150 WILLIAMS ROUTE 22 | | BARRINGTON, IL | | 1 | 3/29/13 18:36 |
| ADVOCATE SOUTH SAM HOSP | 17600 ADAMS AVE | | HAZEL CREST, IL | | 2 | 3/28/13 10:52 |

SKU: 81627146
Serial/Lot: E67987

3201 Stelhorn Rd, Fort Wayne, IN 46815

Home | Contact Us | About the RAM Group | Privacy Policy | Terms and Conditions | Warranty | Media Inquiries | Important Safety Information | Site Map | Logout

FIG. 22

INVENTORY MANAGEMENT SYSTEM AND METHOD

CROSS-REFERENCED APPLICATION

This application is a continuation of U.S. Non-Provisional patent application Ser. No. 15/295,572 filed on Oct. 17, 2016, which was a continuation of PCT Application Number PCT/US2015/026309 filed on Apr. 17, 2015 which claimed priority from and benefit of provisional patent application number 61/981,498, filed on Apr. 18, 2014, and provisional patent application number 62/042,934, filed Aug. 28, 2014, which are incorporated herein by reference, in their entirety, for all purposes.

FIELD OF INVENTION

The Invention relates generally to an inventory management and control system designed specifically for the medical device industry. However, the system and methods described are adaptable across additional industries.

BACKGROUND OF INVENTION

Today, manufacturers of high-dollar medical devices often do not have visibility to these products once they leave the manufacturing facility, thereby creating significant inefficiencies and increased costs in the marketplace. This lack of inventory control equates to the following industry waste: 1) very low inventory turns equating to millions of dollars in working capital waste; 2) high risk of devices expiring in the field, creating risk that devices could be surgically implanted in the human patient; 3) costly recall or field action management, as inventory location is unknown once the product is shipped from the point of manufacture, and 4) an inventory supply/distribution chain that is filled with un-necessary inventory, thereby driving the cost of product and product management up significantly. Today, there are no known electronic data systems that provide visibility to inventory across the country.

One of the inefficiencies in inventory management is the process of recording inventory utilizing computer-readable indicia, such as bar codes. Bar codes on the outside of inventory packages are encoded indicia that reflect can be used to reflect original equipment manager (OEM) name, part number, lot and/or serial number, quantity, and/or expiration date. Scanning bar codes on the outside of packaging using a handheld scanning device can be time-consuming and introduces possibilities of user error when indicia are skipped.

SUMMARY OF INVENTION

Shortcomings of the prior art are overcome and additional advantages are provided through the provision of a method for managing inventory, the method includes: obtaining, by a processor, a signal of decodable indicia; decoding, by the processor, the signal of decodable indicia to access decoded data, wherein the decoded data comprises information identifying an object, wherein the object comprises a plurality of items; based on the information identifying the object, obtaining, by the processor, from a memory, a visual representation of a portion of the object, wherein the visual representation is divided into a plurality of regions and each region represents an item of the plurality of items; displaying, but the processor, the visual representation on a client; obtaining, by the processor, a designation of at least one of the plurality of regions; and based on obtaining the designation, generating an order request for an item represented by the at least one of the plurality of regions.

Shortcomings of the prior art are overcome and additional advantages are provided through the provision of a method for managing inventory, the method includes: obtaining a signal of decodable indicia; decoding the signal of decodable indicia to access decoded data; utilizing the decoded data to retrieve an image, wherein the image is divided into a plurality of regions and each region represents an item; obtaining a designation of at least one of the regions from a client; generating an order request representing at least one item represented by the at least one region selected.

Shortcomings of the prior art are overcome and additional advantages are provided through the provision of a method for managing inventory, the method includes: obtaining, by a processor, a digital image comprising at least one symbol of decodable indicia associated with an item depicted in the digital image; locating, by the processor, the symbol of decodable indicia in the image; decoding, by the processor, the symbol of decodable indicia to access decoded data, wherein the decoded data comprises an expiration date related to the item; obtaining, by the processor, information related to whether the item has been recalled; and based on determining at least one of: the expiration date has lapsed, or the item has been recalled, updating the digital image to contain a visual indicator relative to the item when displayed in a graphical user interface.

Computer systems, computer program products and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

The foregoing and objects, features, and advantages of one or more aspects of the invention are apparent from the following detailed description taken in conjunction with the accompanying drawings in which:

FIGS. 20-25 are screenshots of a graphical user interface (GUI) that depicts aspects of an embodiment of the present invention;

DETAILED DESCRIPTION OF THE INVENTION

Figure 1:
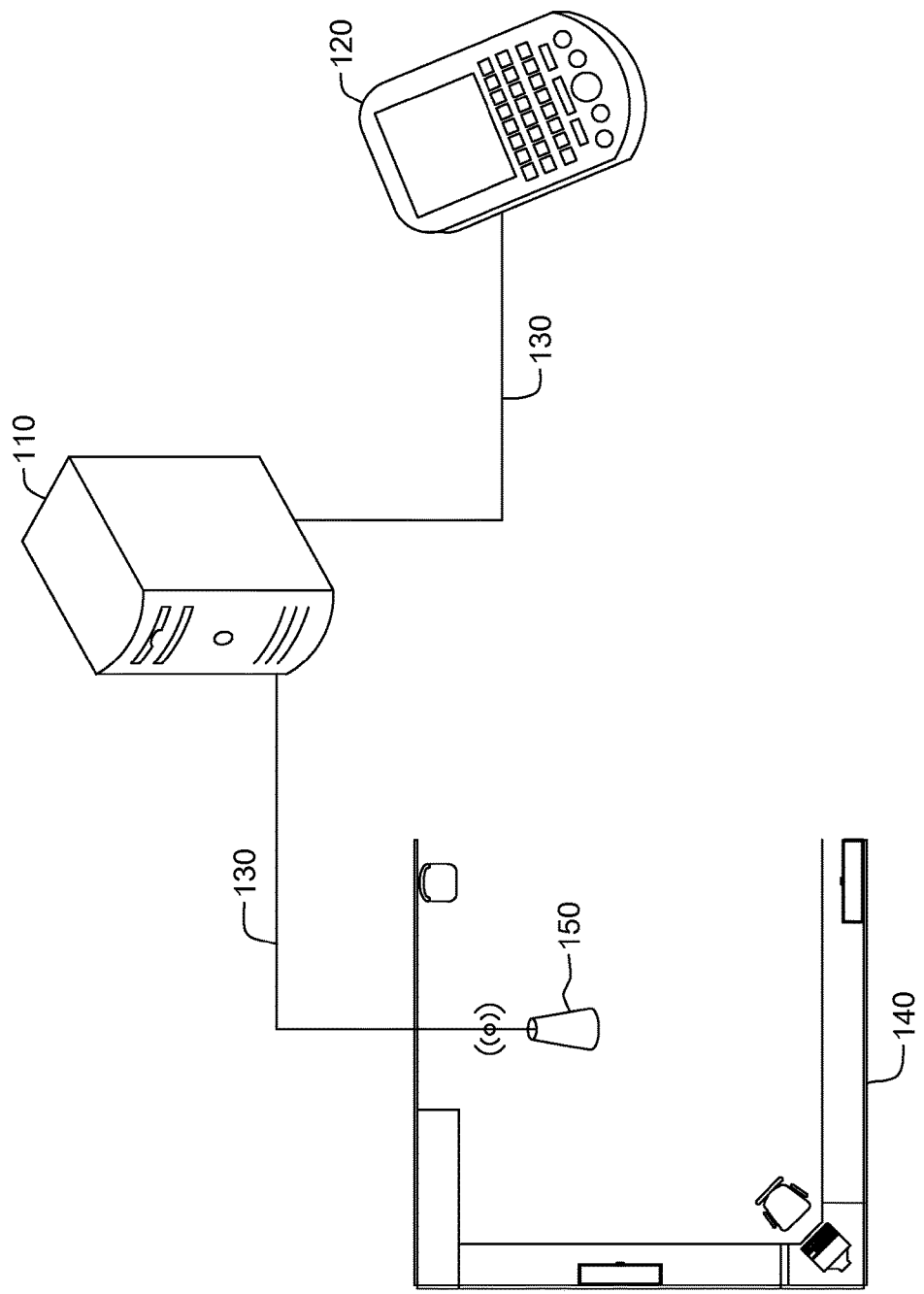
FIG. 1 depicts one example of an aspect a computing environment used to execute one or more aspects of an embodiment of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

Embodiments of the present invention significantly improve the ability of consumers to manage inventory. Aspects of the present invention perform an improved service offering (greater functionality, greater information visibility, improved business decision making) at a much lower cost than the current industry solution for industries, including but not limited to, the medical device industry.

Aspects of embodiments of the present invention enable providers and/or Original Equipment Manufacturers (OEMs) the ability of making inventory in the field highly visible. Visibility means that an authorized individual utilizing the present invention can locate or report on inventory at any stocking location serviced for which there is data available on a memory resources accessible to the system. This functionality enables a single entity to manage the inventory across multiple physical locations because the inventory at each location is "visible." The term OEM refers to original manufacturers of products or components that are purchased by another company and retailed under that purchasing company's brand name. The term OEM refers to the company that originally manufactured the product Embodiments of the present invention may include at least one of the following four components: 1) an inventory management and control system designed specifically for the medical device industry; 2) a hand-held, electronic data capture hardware and software system with advanced image recognition and indicia scanning and reading capabilities for accurately inventorying items; 3) room designed to securely store and manage inventory; 4) management of the following transactions: receipts, transfers, cycle-count, damaged product management, expiration management, and recall management.

In an embodiment of the present invention, the gathering of inventory information from packages inventory can be accomplished by utilizing a mobile computing device, including but not limited to, an encoded information reading (EIR) terminal, configured to read bar codes and/or other types of encoded information, to scan indicia, including but not limited to, bar codes, on the packaging of items. Bar codes on the outside of inventory packages are encoded indicia that can be used to reflect original equipment manager (OEM) name, part number, lot and/or serial number, quantity, and/or expiration date. However, individually scanning bar codes on the outside of packaging using a handheld scanning device can be time-consuming and introduces possibilities of user error when indicia are skipped. An aspect of the present invention includes a system and method that utilizes the aforementioned mobile device to effectively scan a group of items at one time by utilizing software and/or hardware to capture an image of a display of inventory and extract bar codes and/or other encoded indicia from the image. The method further includes utilizing software and/or hardware to decode the extracted bar codes, and to retain the decoded information. The retained information assists in managing the inventory, both on the particular display and/or at different locations.

An embodiment of the present invention is an inventory management and control system that can be adapted for use, for example, in the medical device industry, among other industries. As defined in this specification, medical devices include both implants and instruments. Embodiments of the present invention include the following components and/or functionalities: 1) advanced analytics and report writing capabilities for data analysis; 2) item master maintenance and management; 3) a repository for all inventory transactions executed in the field; 4) a replenishment engine for issuing inventory replenishment transactions to the OEMs; 5) a scheduling system for scheduling ongoing/continuous inventory services; and/or 6) and inventory management and control system configured to capture information related to the consumption of managed inventory (e.g., medical materials in an operating room (OR) at the time of completion of an OR procedure).

Embodiments of the present invention enable users to manage for example, processes relating specifically to the high-dollar value medical devices, including but not limited to: 1) Receipts; 2) Transfers; 3) Cycle-count; 4) Damaged Product Management; 5) Expiration Management; 6) Recall Management.

FIG. 1 is an example of an architecture 100 that can be utilized by embodiments of the present invention. At least on computer server 110 with at least one processor executes program code as part of an inventory management and control system. This program code is also referred to as software throughout this disclosure. Memory resources on the computer server 110 and and/or in communication with the program code executes on the server can also comprise part of the inventory management and control system. The server 110 communicates with at least one mobile computing device 120, including but not limited to, an encoded information reading (EIR) terminal, configured to read bar codes and/or other types of encoded information. In an embodiment of the present invention, the mobile computing device 120 comprises an EIR terminal with image recognition and bar code scanning and reading capabilities which are utilized, in an embodiment of the present method, for accurately inventorying medical devices. In FIG. 1, the server 110 can communicate with the mobile computing device 120 over a communications connection 130.

Embodiments of the present invention can also include a "room" 140 designed to securely store and manage for example, high-dollar value medical devices and/or other inventory (including instruments). Although represented as a single room in FIG. 1, the room 130 represents one to many rooms and/or spaced. This room will be a secure location that, in embodiments of the present invention, supports RFID capture of inventory passing into the room (receipts) and inventory passing out of the room (issues). The information captured by RFID reading devices 150 in the room. The data captured by the RFID reading devices 150 can be communicated electronically to the server 110.

In an embodiment of the present invention, features of the room 140 include that is it a secure room to inventory (stock or store), which can include high-dollar medical devices. Also, medical devices would each have an RFID chip affixed to the package. Thus, as medical devices are removed from the room through an electronic reader in the doorway, the "issue transaction" would be electronically captured into Analytics Engines housed accessible to the server 110. Also, as medical devices are placed back in the room, they would pass through an electronic reader in the doorway and a "receipt transaction" would be electronically captured by program code on the server comprising the analytics engine, which is discussed throughout this disclosure. The use of the room 140 is not limited to storing medical devices, as the room 140, as well as the invention in its entirety, is useable across a broad range of industries including the automotive industry, general retail industries, such as jewelry and clothing, etc.

Figure 2:
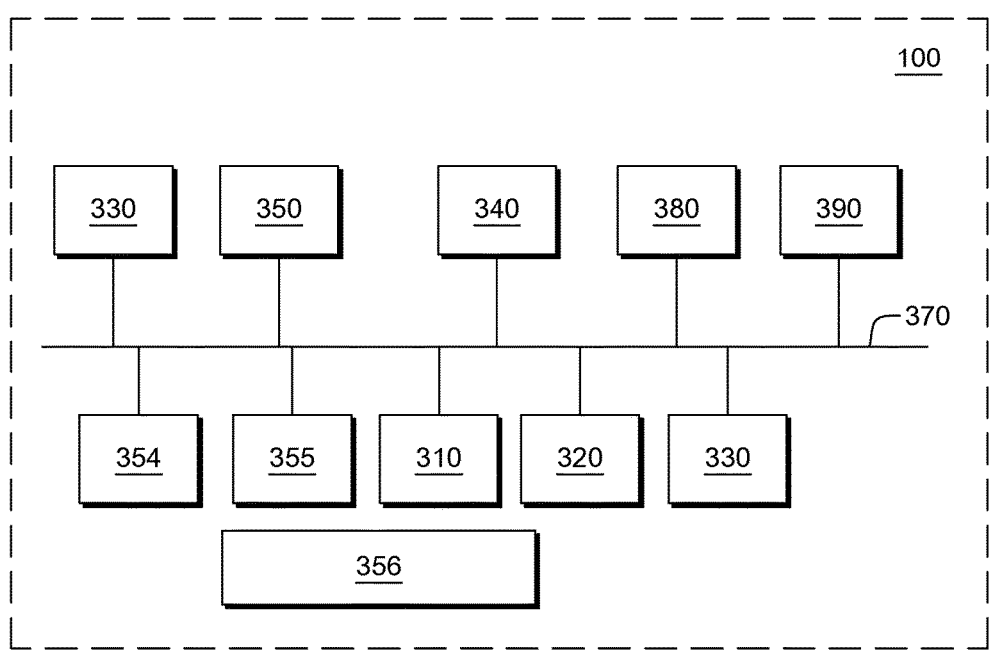
FIG. 2 depicts one or more aspects of an EIR terminal utilized in an embodiment of the present invention.
Figure 7:
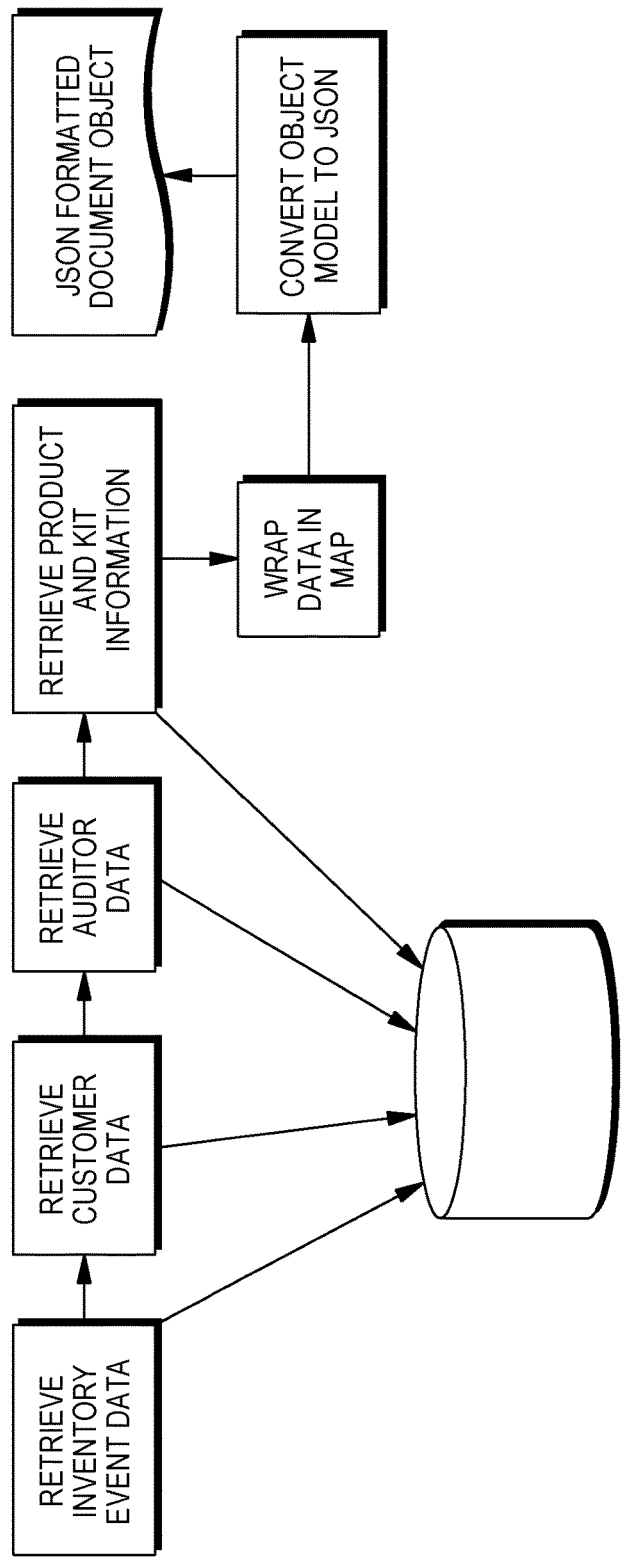
FIGS. 7-11 are relational diagrams that depict aspects of an embodiment of the present invention.

FIG. 2 is a component-level diagram of one embodiment of an EIR terminal, which is an example of a mobile computing device 120 that can be utilized in an embodiment of the present invention. In the example of FIG. 7, the EIR terminal 100 can comprise at least one microprocessor 310 and a memory 320, both coupled to the system bus 370. The microprocessor 310 can be provided by a general purpose microprocessor or by a specialized microprocessor (e.g., an ASIC). In one embodiment, EIR terminal 100 can comprise a single microprocessor which can be referred to as a central processing unit (CPU). In another embodiment, EIR terminal 100 can comprise two or more microprocessors, for example, a CPU providing some or most of the EIR terminal functionality and a specialized microprocessor performing some specific functionality. A skilled artisan would appreciate the fact that other schemes of processing tasks distribution among two or more microprocessors are within the scope of this disclosure.

EIR terminal 100 can further comprise a communication interface 340 communicatively coupled to the system bus 370. In one embodiment, the communication interface can be provided by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family.

EIR terminal 100 can further comprise a keyboard interface 354 and a display adapter 355, both also coupled to the system bus 370. EIR terminal 100 can further comprise a battery 356. In one embodiment, the battery 356 can be provided by a replaceable rechargeable battery pack.

EIR terminal 100 can further comprise a GPS receiver 380. EIR terminal 100 can further comprise at least one connector 390 configured to receive a subscriber identity module (SIM) card.

EIR terminal 100 can further comprise one or more EIR devices 330, provided, for example, but not limited to, by an RFID reading device, a bar code reading device, or a card reading device. In one embodiment, EIR terminal 100 can be configured to read an encoded message using EIR device 330, and to output raw message data containing the encoded message. In another embodiment, the EIR terminal 100 can be configured to read an encoded message using EIR device 330, and to output decoded message data corresponding to the encoded message. As used herein, "message" is intended to denote a character string comprising alphanumeric and/or non-alphanumeric characters. An encoded message can be used to convey information, such as identification of the source and the model of a product, for example, in a UPC code.

Mobile computing devices that read bar codes, read RFID, or read cards bearing encoded information may read more than one of these categories while remaining within the scope of this disclosure. For example, a device that reads bar codes may include a card reader, and/or RFID reader; a device that reads RFID may also be able to read bar codes and/or cards; and a device that reads cards may be able to also read bar codes and/or RFID. For further clarity, it is not necessary that a device's primary function involve any of these functions in order to be considered such a device; for example, a cellular telephone, smartphone, or PDA that is capable of reading bar codes is a device that read bar codes and can constitute a mobile computing device 120, as seen in FIG. 1, for purposes of this disclosure.

In an embodiment of the present invention, the EIR terminal 100 includes a digital camera component 350, which enables the EIR terminal 100 to capture digital images, which may be processed by the one or more processing units of the EIR terminal 100. The EIR terminal 100 may also include a graphical user interface (GUI) (not pictured) to display images captured by the digital camera component 350 of the EIR terminal 100 and alerts and information to the operator of the EIR terminal. For example, as will be discussed later in greater detail, the GUI can display to the operator that an item that was scanned by the EIR terminal 100 has expired and/or has been recalled.

Figure 3:
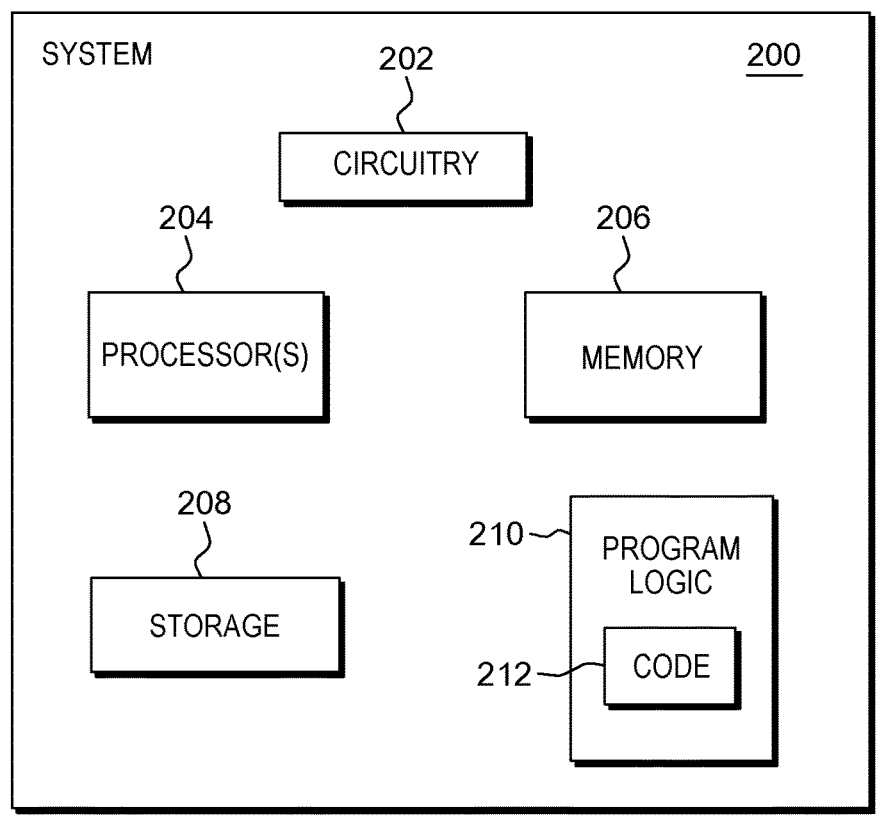
FIG. 3 depicts one embodiment of a single processor computing environment to incorporate and use one or more aspects of the present invention.

FIG. 3 illustrates a block diagram of a resource 200, like server 110, in computer system 100, which is part of the technical architecture of certain embodiments of the technique. The resource 200 may include a circuitry 202 that may in certain embodiments include a microprocessor 204. The computer system 200 may also include a memory 206 (e.g., a volatile memory device), and storage 208. The storage 208 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 208 may comprise an internal storage device, an attached storage device and/or a network accessible storage device. The system 200 may include a program logic 210 including code 212 that may be loaded into the memory 206 and executed by the microprocessor 204 or circuitry 202.

In certain embodiments, the program logic 210 including code 212 may be stored in the storage 208, or memory 206. In certain other embodiments, the program logic 210 may be implemented in the circuitry 202. Therefore, while FIG. 2 shows the program logic 210 separately from the other elements, the program logic 210 may be implemented in the memory 206 and/or the circuitry 202.

Using the processing resources of a resource 200 to execute software, computer-readable code or instructions, does not limit where this code is can be stored. The terms program logic, code, and software are used interchangeably throughout this application.

Figure 4:
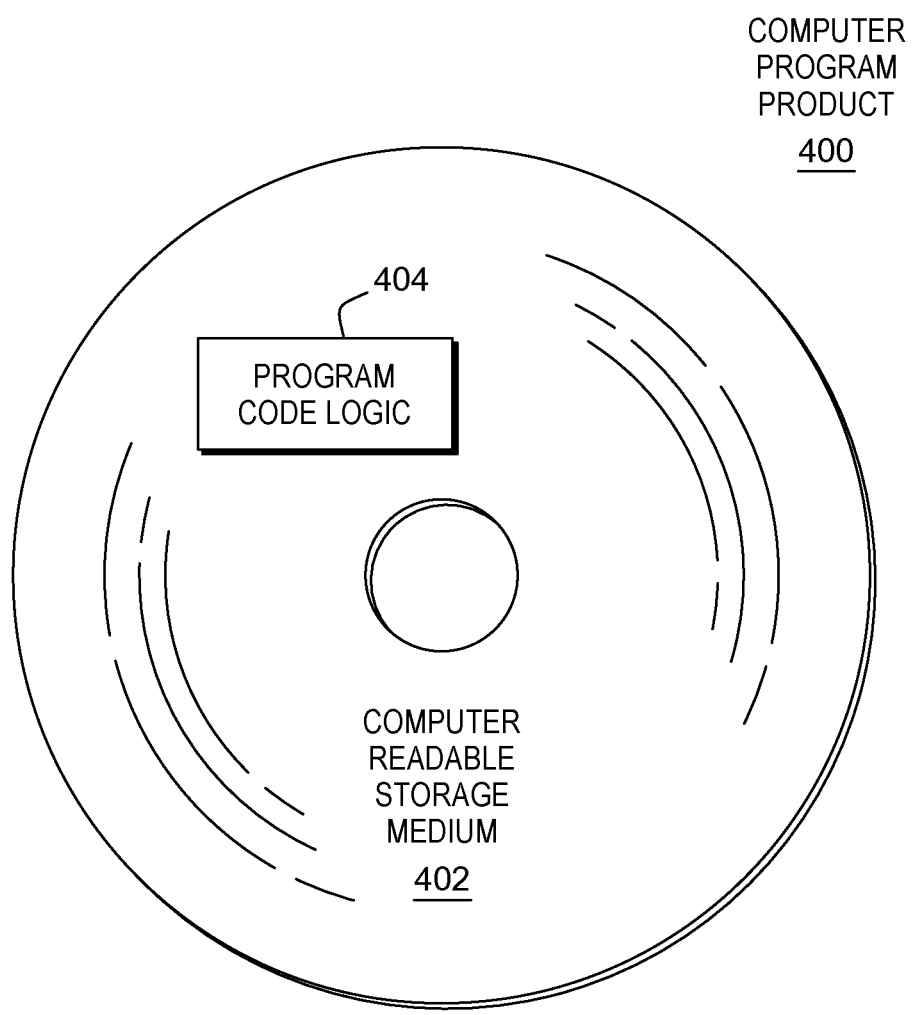
FIG. 4 depicts one embodiment of a computer program product incorporating one or more aspects of the present invention.

Referring to FIG. 4, in one example, a computer program product 400 includes, for instance, one or more non-transitory computer readable storage media 402 to store computer readable program code means or logic 404 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions, also referred to as computer program code, may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique. As a further aspect of the technique, the system can operate in a peer to peer mode where certain system resources, including but not limited to, one or more databases, is/are shared, but the program code executable by one or more processors is loaded locally on each computer, including the mobile computing device 120 of FIG. 1.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

As aforementioned, an embodiment of the present invention includes a centralized inventory management system hosted on one or more computer resources, such as the server 110 of FIG. 1, and a mobile computing device, such as the EIR terminal 200 of FIG. 2.

In an embodiment of the present invention, the mobile computing device is a hand-held, electronic data capture system with advanced image recognition and bar code scanning and reading capabilities for accurately counting medical devices. This device interfaces with the analytics engine to support inventory management and inventory replenishment of medical devices. In an embodiment of the present invention, the program code executed by a processing resource on the mobile device is configured for use in the medical device industry. Among the software features customized for this industry is the capability to select areas on an image of a device tray, where small, un-marked parts would be positioned and create a replenishment order based on this selection. In order to utilize this feature, a user can utilize the EIR capabilities of the mobile device to scan a barcode and/or an RFID. After making this selection, program code executing either on the device and/or at the server decodes this identification information to recognize the item that was scanned. In this example, the scanned item comprises a group of trays containing many small items. After identifying the item scanned, the program code renders a visual of each tray of the device through a graphical user interface (GUI) on the mobile device. The user then compares the images of the trays to the actual trays and selects the regions on the image that represent missing items in the trays. The user selections are communicated from the mobile device to the analytics engine on the server and the analytics engine can then determine how many pieces there should be in located in that storage slot and will issue a replenishment order for the missing number of pieces.

Embodiments of the present invention, including those embodiments that assist in managing inventory related, for example, to the medical industry, and, specifically, the medical device industry, utilize images of kits in an interactive manner in order to assist in the replenishment of missing parts. Utilizing this technique, users (e.g., auditors) would select the items from the image that are missing from the kit by touching the item in the picture. In an embodiment of the present invention, selecting elements of an image in the GUI would cause the program code to "Gray Out" the selected item or items in the image. This graying of the product would signify that the item(s) were not present in the kit. The program code will then build the inventory list based upon the image, meta-data and user inputs.

In an embodiment of the present invention, the image-based selection and subsequent inventory list creation can be understood as comprising three sub-systems and/or modules. The modules are: 1) Kit Definition and Hotspot Mapping; 2) Data Synchronization System; and 3) Mobile Application Auditing Software. In the explanation of the modules (sub-systems), kits utilized in the orthopedic industry are used as examples of inventory that can be managed. One of skill in the art will recognize that the disclosed system and methods are also applicable across other industries and for inventorying other items.

In an embodiment of the present invention, program code executed on one or more processors comprises a Kit Definition and Hotspot Mapping system which is a sub-system that is responsible for configuring each kit into the Analytics Engine. This includes adding high-resolution images of each layer in the kit, assigning products to each layer and associating coordinate points (in a rectangle, circle or polygon) to each product.

In an embodiment of the present invention, program code executed on one or more processors comprises a Data Synchronization System. This data synchronization sub-system is responsible for the communication of product and kit meta-data between the Analytics Engine and the program code executed by a processing resource on the mobile computing device.

Figure 5:
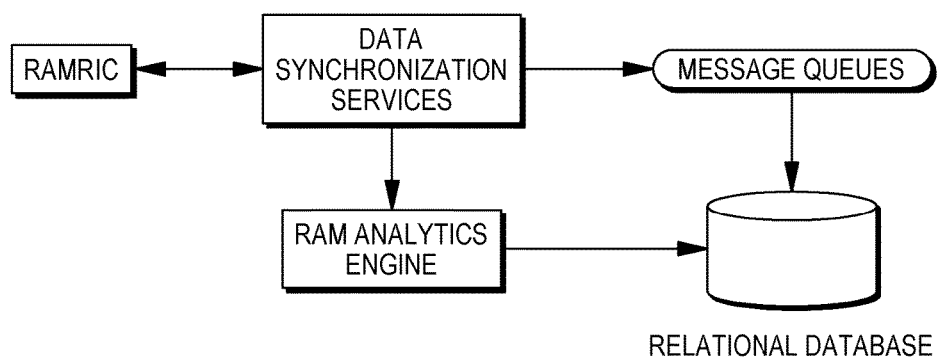
FIG. 5 is a relational diagram that depicts aspects of an embodiment of the present invention.

In an embodiment of the present invention, program code executed on one or more processors comprises Mobile Application Auditing Software. This sub-system is responsible for interpreting the product and kit meta-data as well as user interactions with the kit images. Upon completion of these interactions, the application will, utilizing the kit meta-data, create the inventory record for the inventoried kit FIG. 5 shows the interaction of three main systems that comprise aspects of the present technique: The Analytics Engine, the Data Synchronization Services, and a Remote Inventory Control mobile application. Each of these components work in harmony to provide an enterprise class technique that scales to handle thousands of inventory points and millions of SKUs.

The image-based selection for inventory management relies upon the existence of back-end data, including meta-data and data, which include product and scheduling data, as well as kit layer information for processing kits. Although this data can be stored on a server, or in a centralized database, the program code executing on the mobile computing device, which can be termed the Mobile Application Auditing Software can request a data synchronization to transfer the meta-data from the analytics engine to a memory resource local to the mobile device. The data synchronization enables the mobile application to operate in environments without an easily accessible communications connection.

The visual kit inventory described relies on meta-data. When using the visual scanning feature for kits, the meta-data supporting this operation includes, but is not limited to, data definitions pertaining to: kit information, kit layer information, and layer products. Kit Information is data specific to a kit itself and includes, but is not limited to, SKU numbers, kit aliases, descriptions, lot codes, and the number of layers present within the kit. Kit Layer Information includes kit layer meta-data which includes the high-resolution images of the kit and information designating which layer each image pertains to (e.g., First/top, second, etc.). Layer Products meta-data provides the product ID and product information for each product present on the kit layer. As will be understood by one of skill in the art, although the product utilized in the examples given is a medical kit commonly utilized in an OR, the techniques of the present invention can be applied to any items and are especially helpful when the inventory is kept in layers in a given container, like, for example, a tool case.

Figure 6:
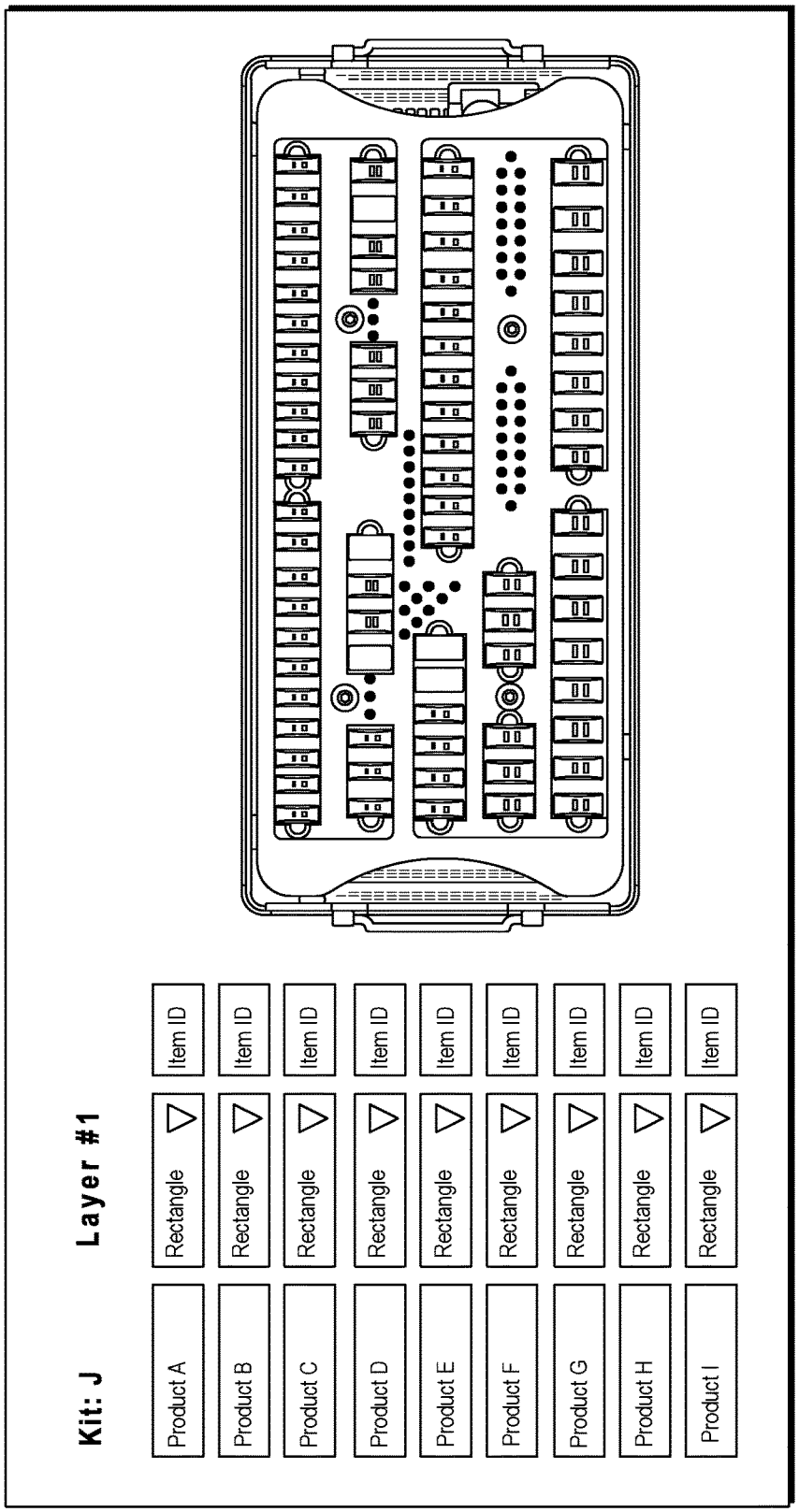
FIG. 6 is a screenshot of a graphical user interface (GUI) that depicts aspects of an embodiment of the present invention.

Once the kit layers, images and products have been obtained, the program code can create the coordinate points/shapes for each product location on each image. FIG. 6 is an example of how this portion of the described method is implemented.

Referring to FIG. 6, a list of products will be presented for each item on the layer. A user, such as an administrator, will choose a shape type and place it on the image for each product. The program code obtains this selection and associated the selected shape with the coordinating item in the list. When the layer is saved, the shape coordinates for each item in the list is saved and associated to the layer.

In an embodiment of the present technique, a Data Synchronization System, which can be understood as an aspect of the present invention, has 2 main components: an incoming data synchronization (Inventory Data) and an outgoing data synchronization (Meta-Data and Event information).

The outbound data synchronization is responsible for getting new or updated meta-data information to the mobile application (program code executing on the mobile computing device). The Data Synchronization Service will receive a restful call for the data sync. The data sync request can have at least 2 types. For example, the client may request an initial or complete data load. This will transmit all meta-data to the client. This is often used to initialize a new mobile device to the end user. Additionally, the client may request an incremental sync, which only sends data changes since the date and time of the last update.

Once the request has been received, the Data Synchronization Service will fire off an action request to each service type and retrieve the data. The data will be added to a Hash Map and converted to a JSON (JavaScript Object Notation) document. JSON is a text based data exchange that allows for easy serialization, transmittal and deserialization of the Object Model. JSON is an example of one type of data exchange used in an embodiment of the present invention. One of skill in the art will recognize that additional comparable technologies can be substituted in further embodiments of the present invention. FIG. 7 visualizes aspects of the described data synchronization process.

Figure 8:
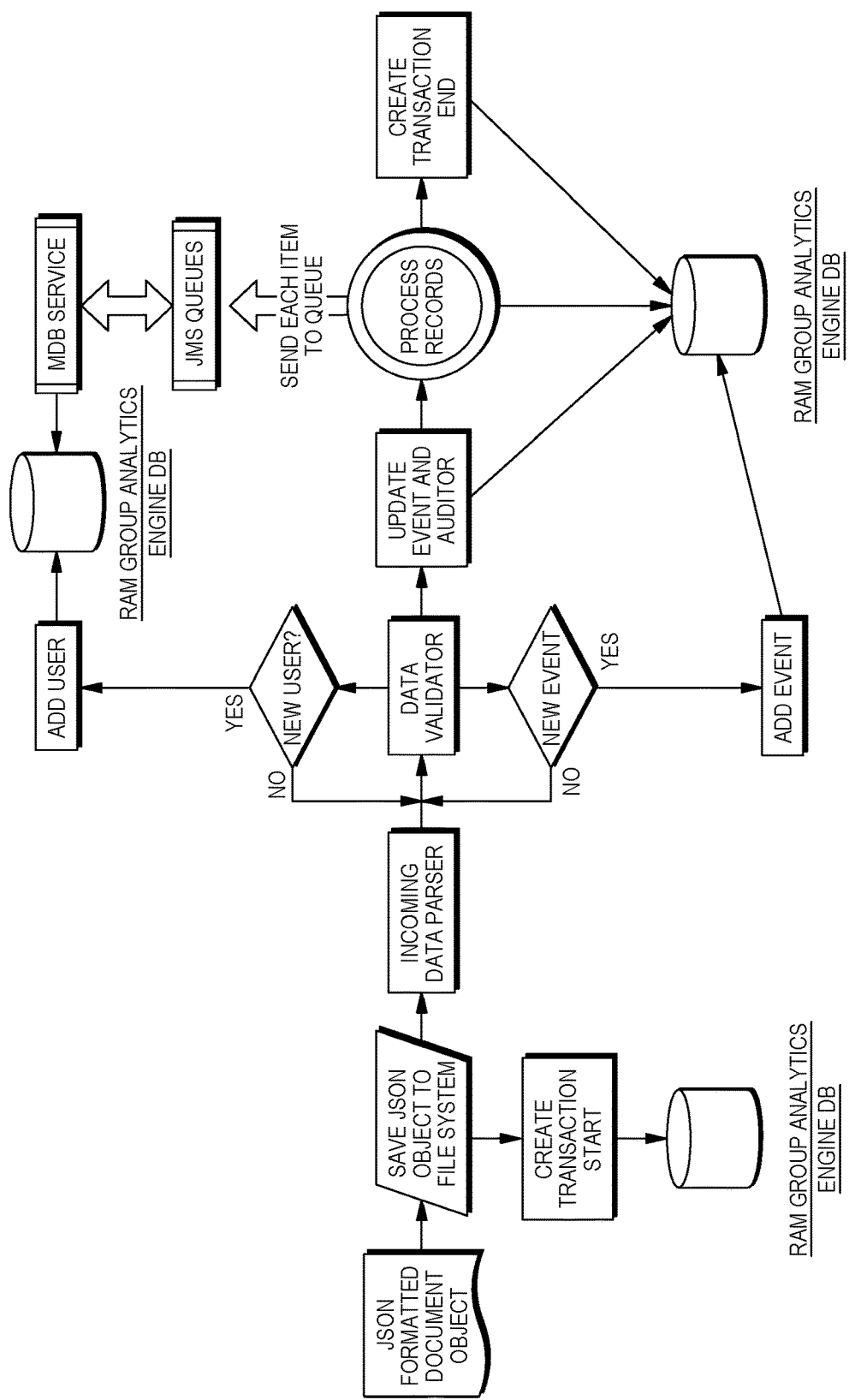

The inbound data synchronization process includes storing the data received from the inventory (including all of the kit data) and process it into the Analytics Engine Database. Data received can be processed utilizing a transaction to ensure that all of the data will be successfully processed and can be easily undone if there are any issues with the feed. FIG. 8 provides a detailed view of data flows in embodiments of the present invention.

Figure 9:
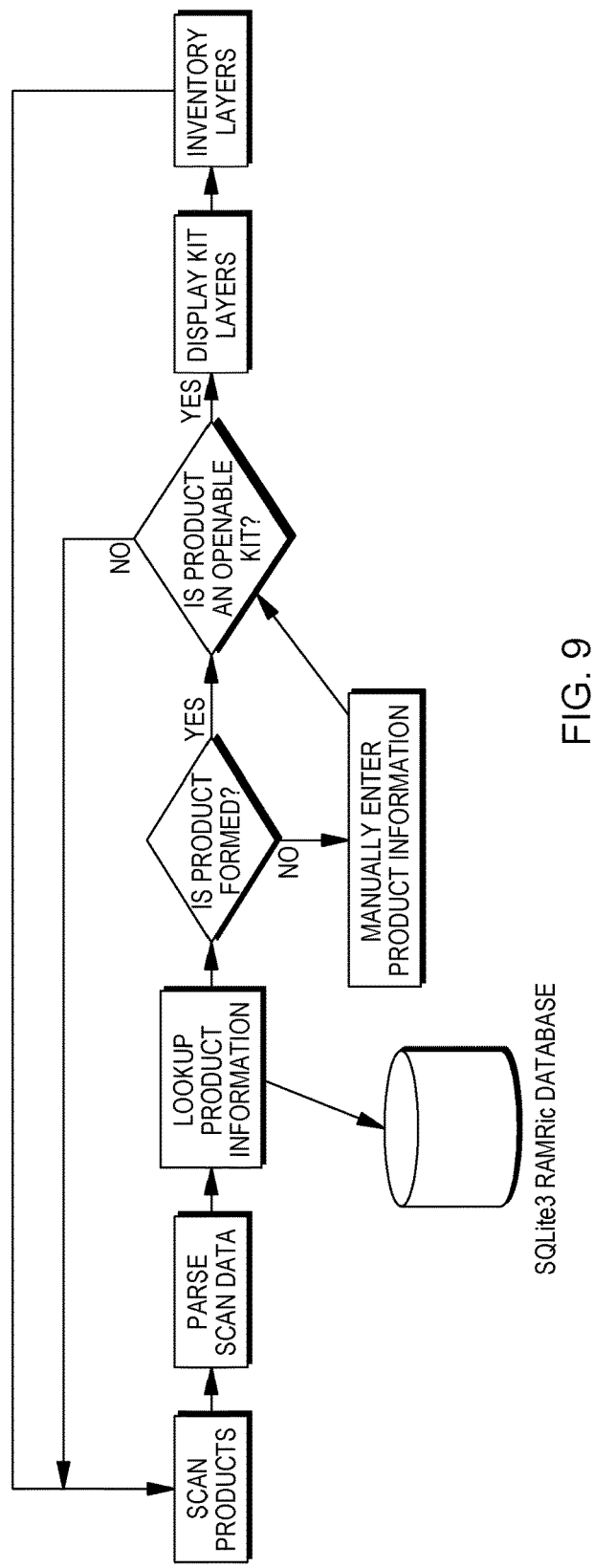

Mobile Application Auditing Software is utilized during the kit inventory process. As the auditor (user) is scanning each item on the shelf, the program code will parse the incoming data and lookup the product information to ensure the product scanned can be identified in the database (in this embodiment, the local database, as the data from the analytics engine has been synchronized, in some embodiments that do not utilize data synchronization, the mobile device can access a centralized database located on a server). If the product cannot be identified, the auditor will manually enter the information into the system. If the product is identified by the program code as a kit, the system will prompt as to whether or not the kit can be opened. If the kit can be opened, the auditor will inventory the kit. FIG. 9 outlines the audit process.

Figure 10:
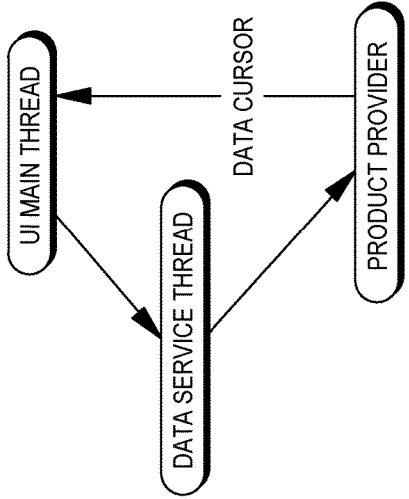

In an embodiment of the present invention, while the user is scanning products, or using the Kit inventory process, the data is retrieved from the database utilizing the services layers, as seen in FIG. 10.

Figure 11:
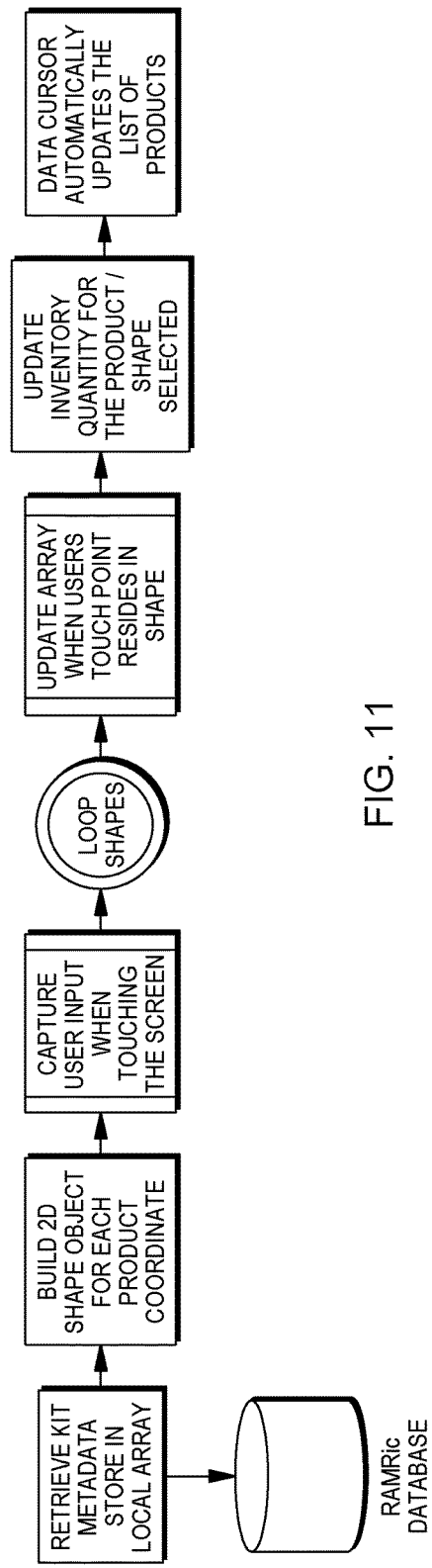
Figure 13:
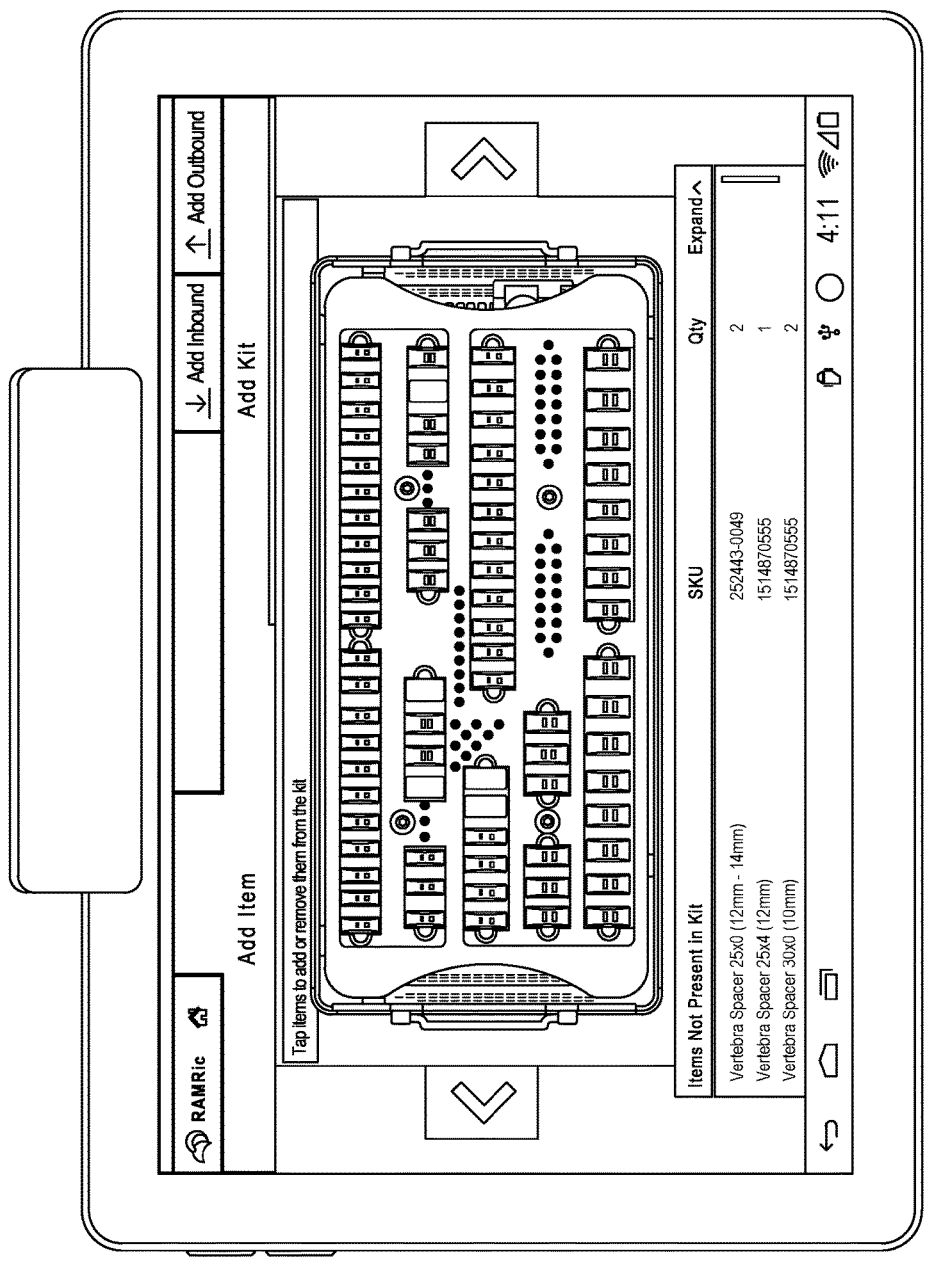

In an embodiment of the present technique, and as seen in FIG. 11, if the product scanned is a kit and the kit may be opened to audit, the system will load the associated image for the kit and layer. User may navigate between layers using the arrows on the side of the layer image. The auditor will then compare the picture on the screen and select items that are not present on the kit layer. This will cause the item to "Gray Out" on the image. Once the inventory has been completed for the kit, the program code determines which products are present (and those that are not) and builds the inventory list for the kit. FIG. 11 illustrates an image associated with a kit and layer that is displayed by the program code. FIG. 13 illustrates that the user can select items missing in the actual kit from the image displayed on the kit layer.

Figure 12:
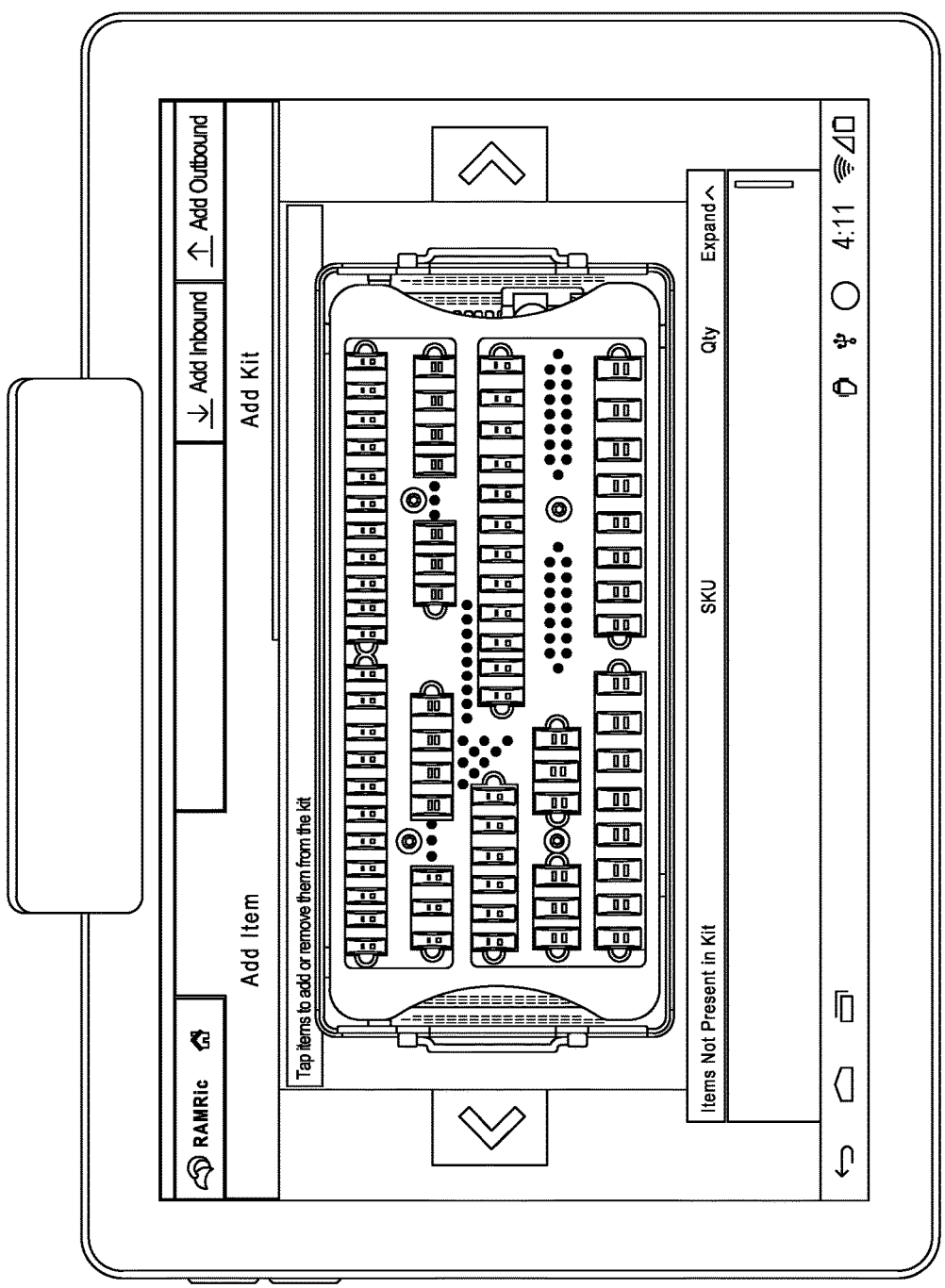
FIGS. 12-15 are screenshots of a graphical user interface (GUI) that depicts aspects of an embodiment of the present invention.

FIG. 12 is a rendering by the program code of a full layer from a given kit in the GUI. The program code produces this picture upon obtaining a barcode and/or other indicia, decoding the indicia, and determining that it represents a kit with the pictured tray. Upon viewing this picture, a user can compare the picture of the full tray, in FIG. 12, with the actual tray s/he is examining. When the user locates empty areas in the actual tray, the user can select the missing items in the GUI. As seen in FIG. 13, the user can select and highlight areas where items are missing. The program code receives these selections and creates a record of missing items for transmission to the server so that the analytics engine can create a replenishment order.

Figure 14:
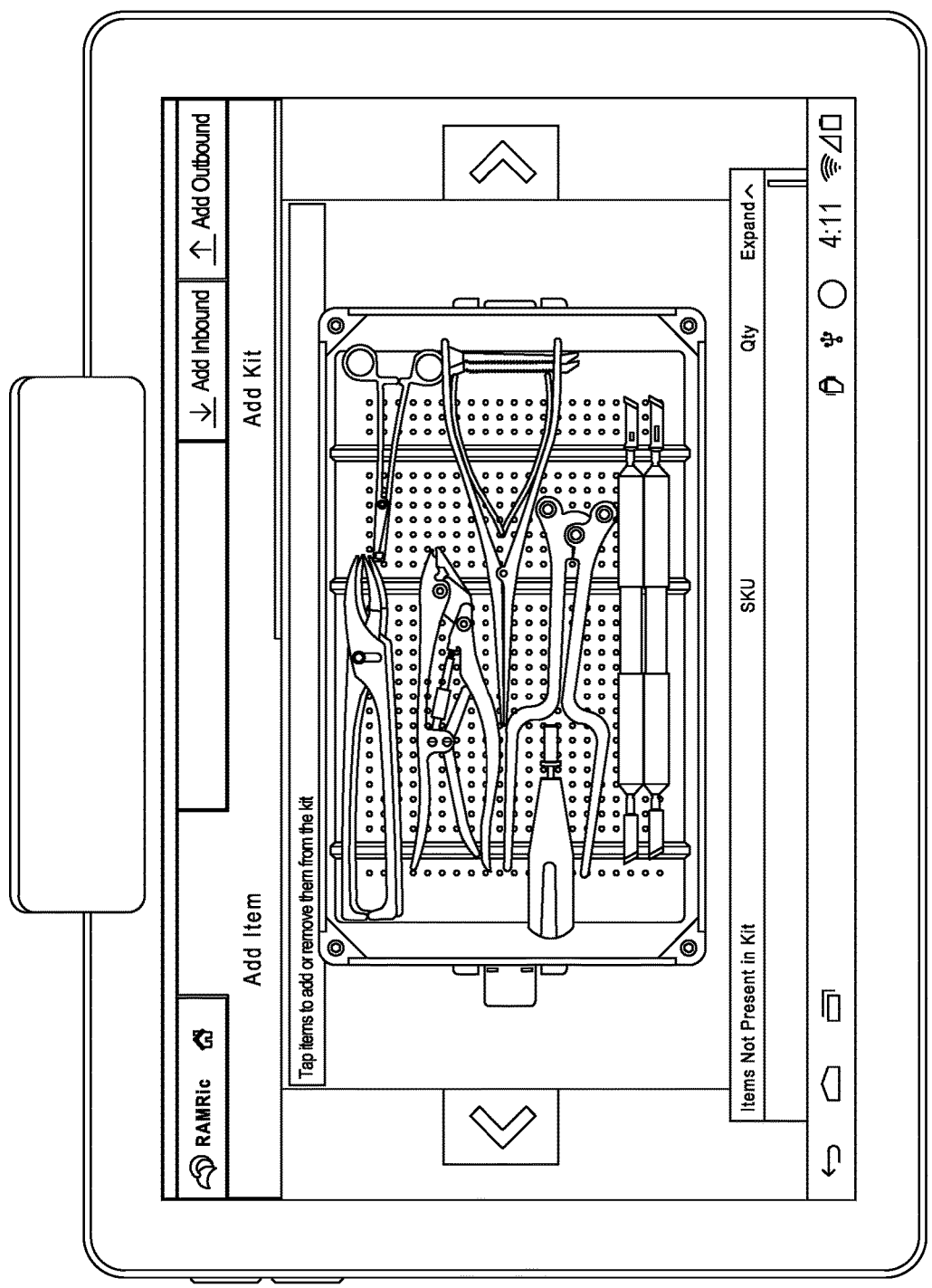
Figure 15:
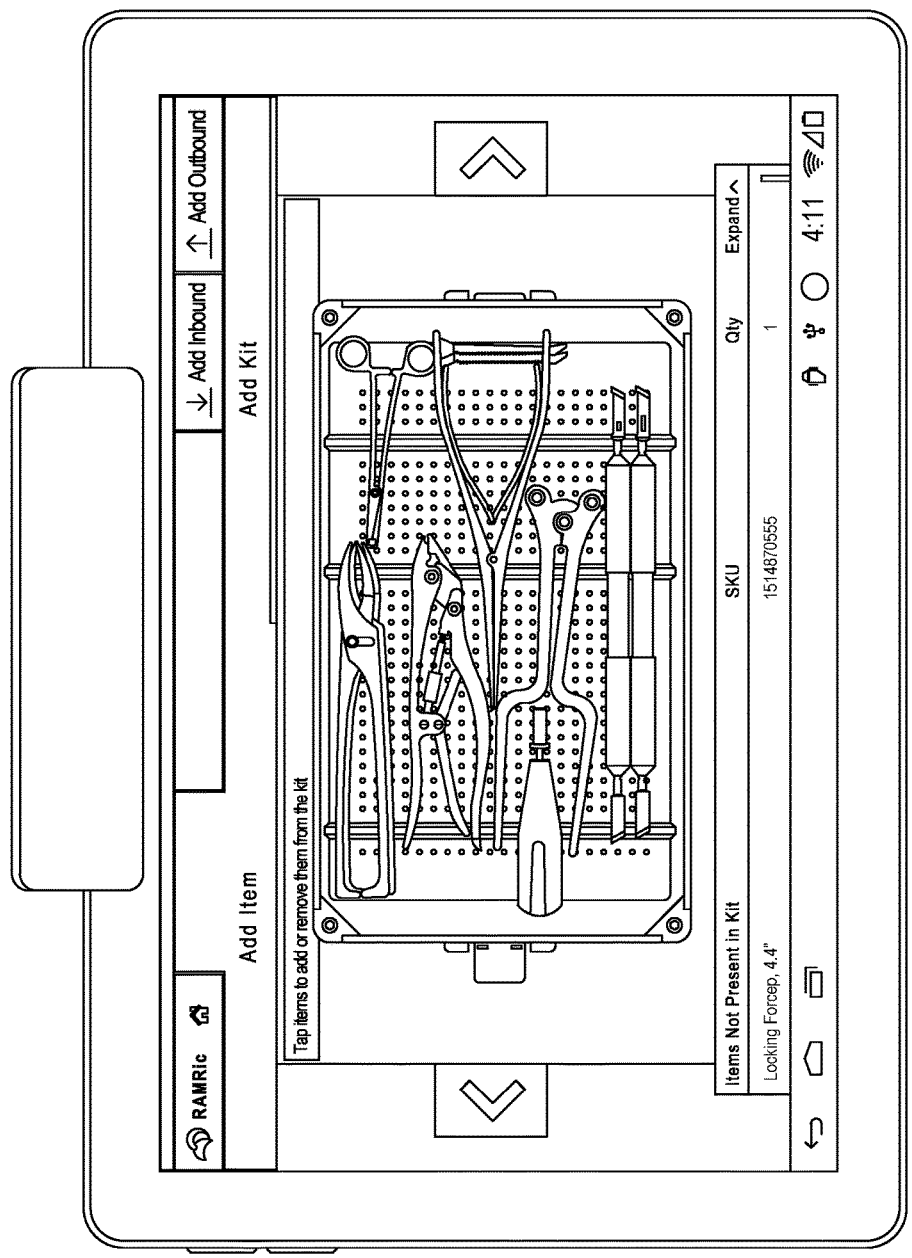
Figure 16:
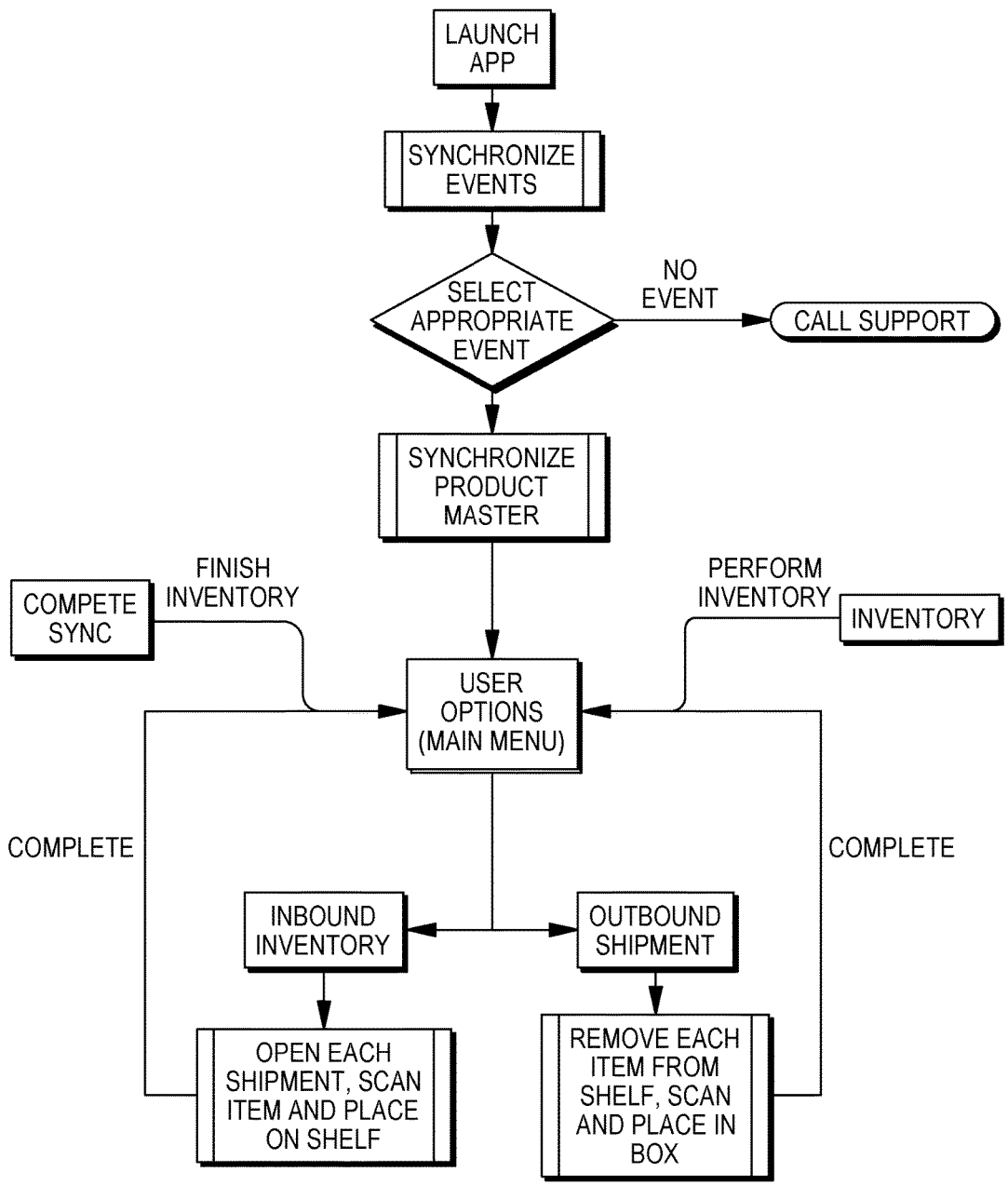
FIGS. 16-19 are workflows that depict aspects of an embodiment of the present invention.
Figure 17:
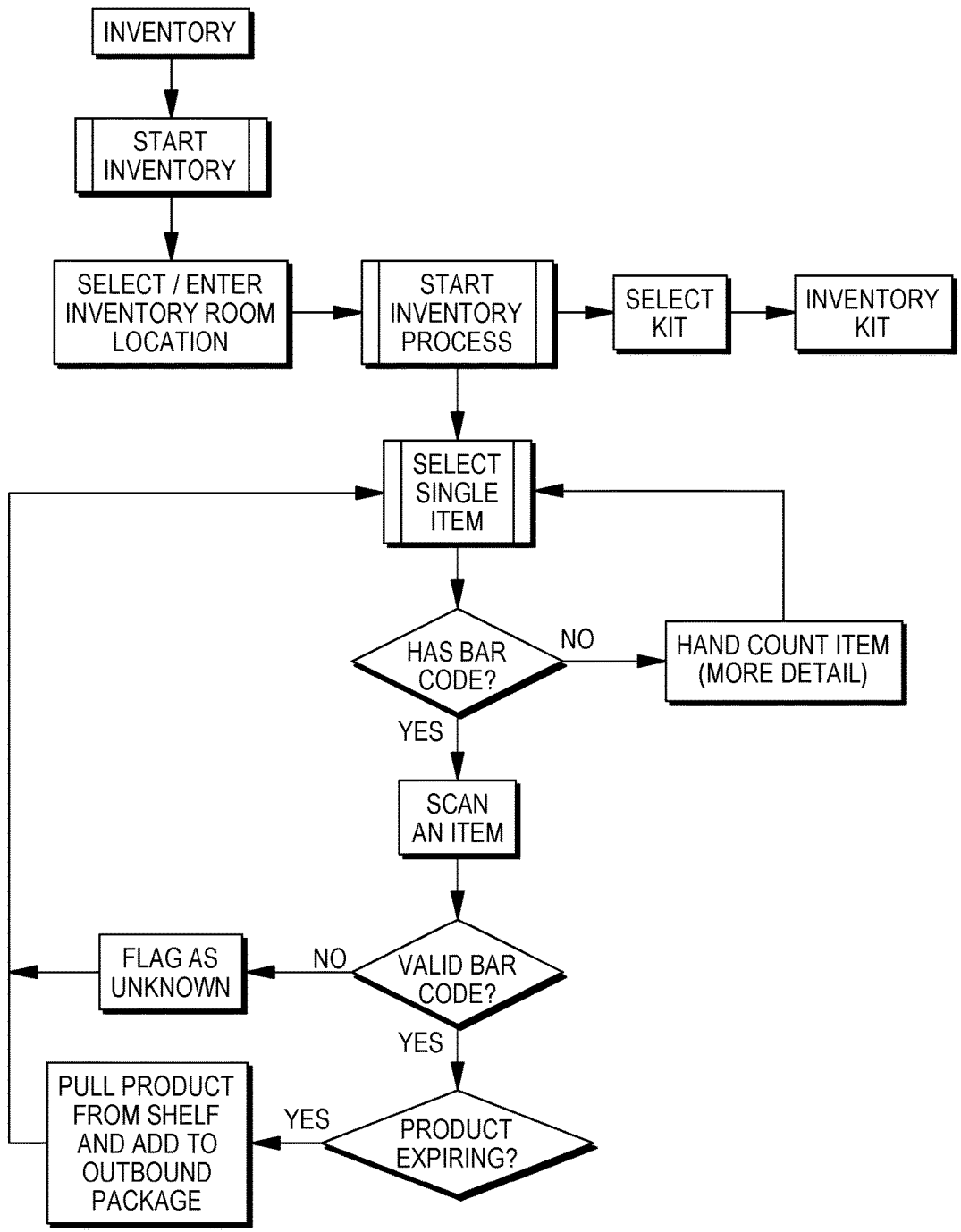
Figure 18:
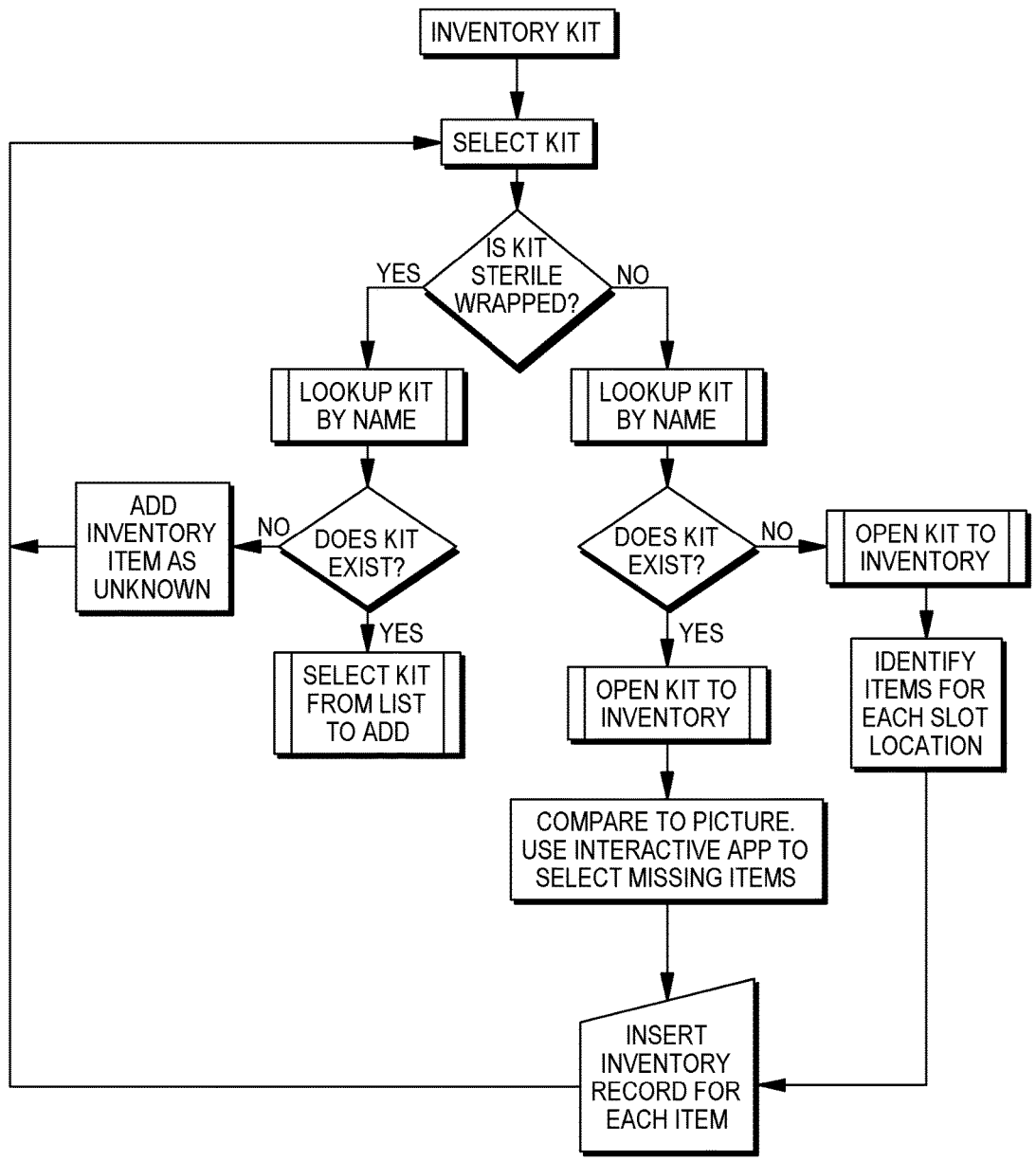
Figure 19:
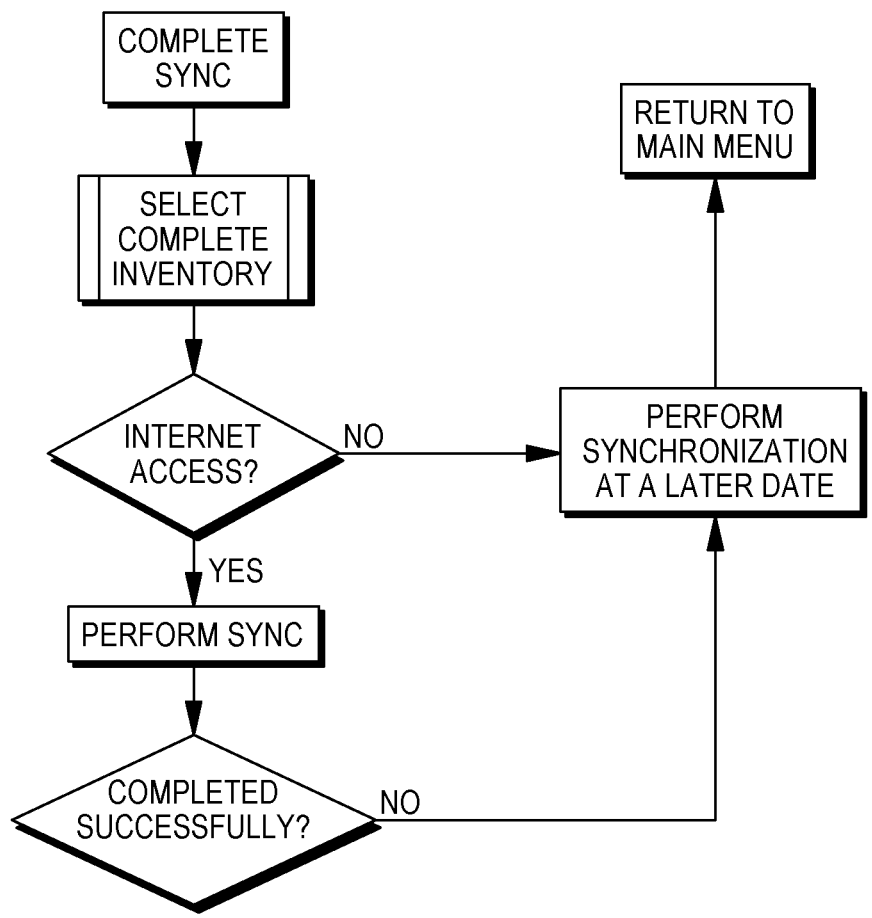
Figure 23:
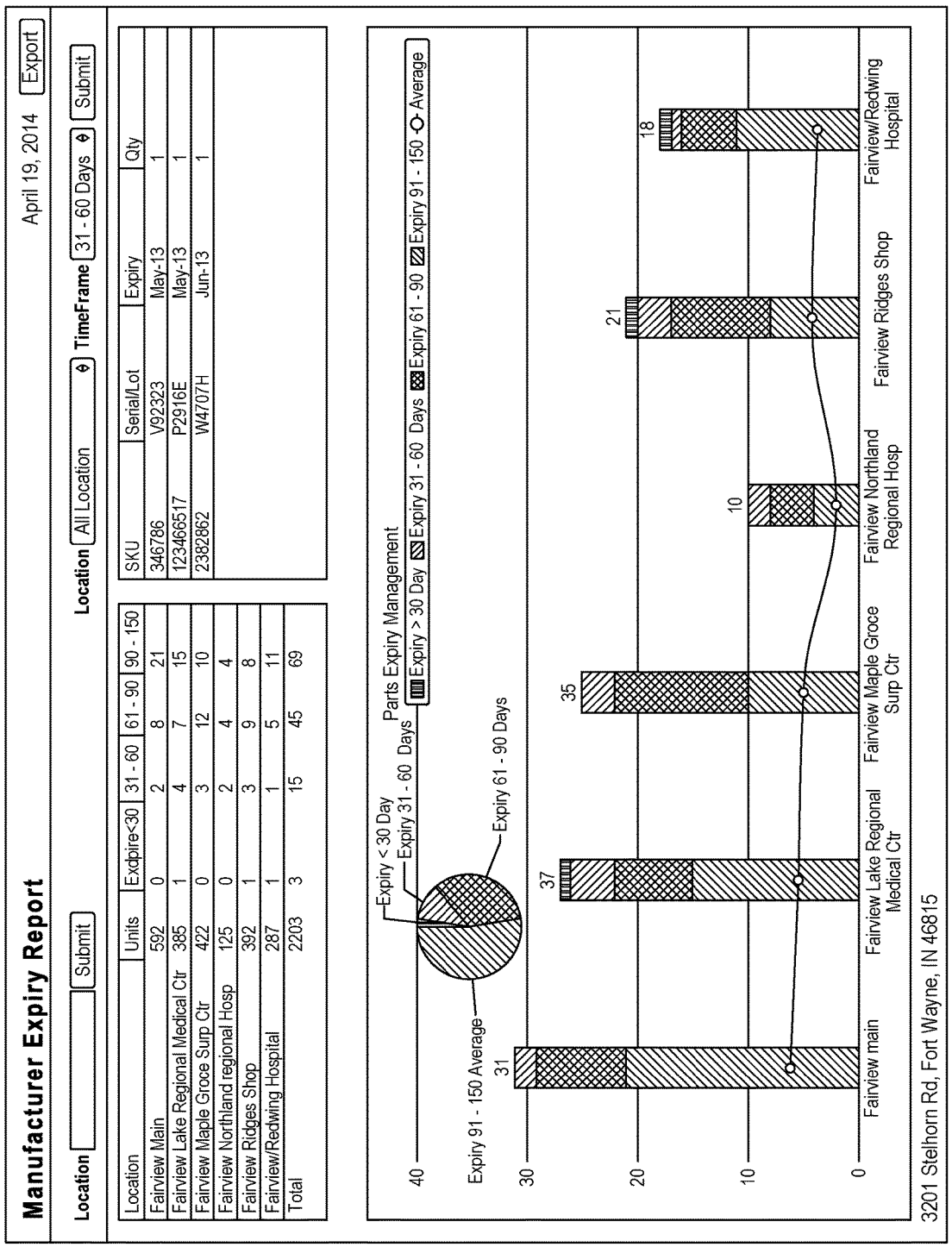
Figure 24:
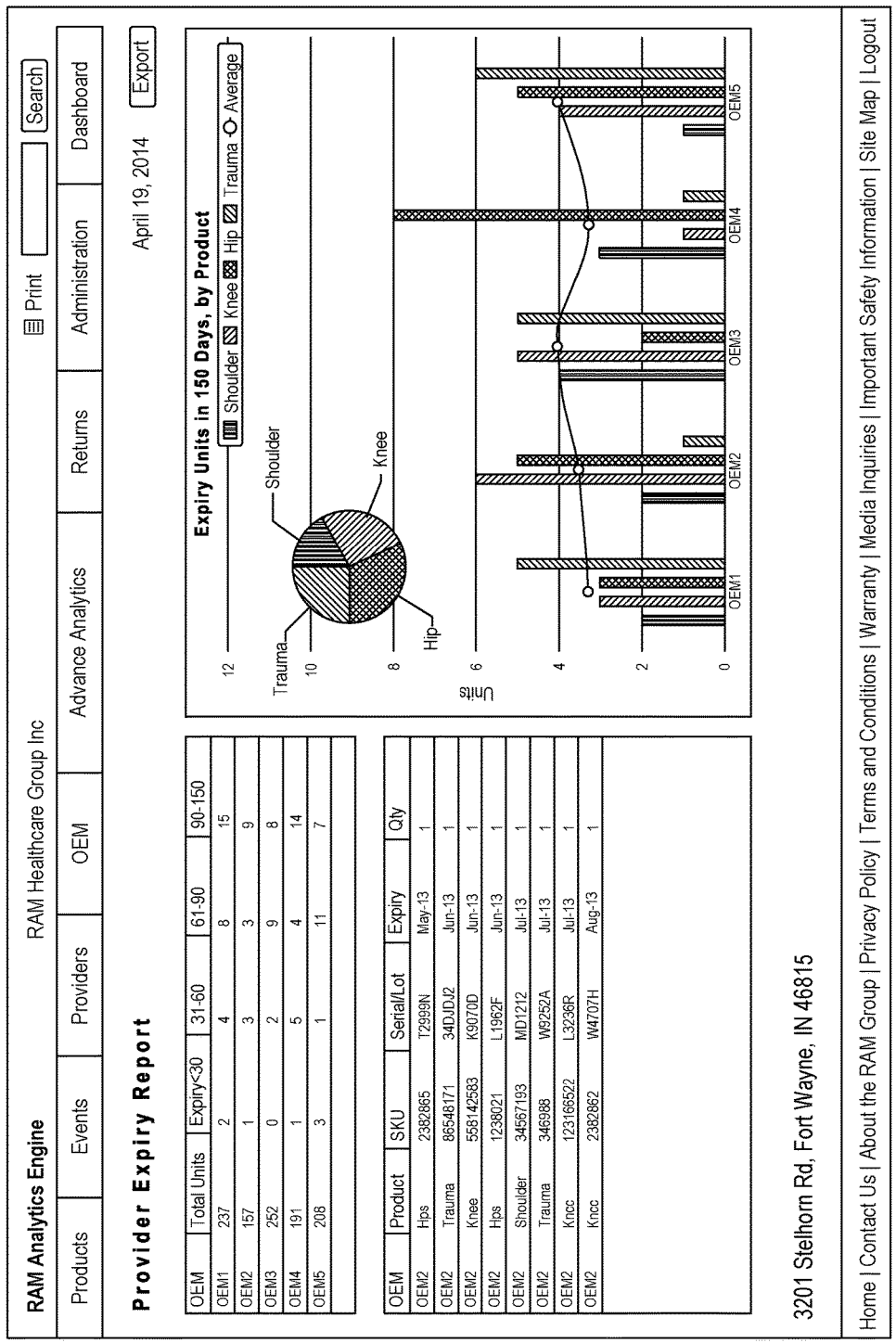
Figure 25:
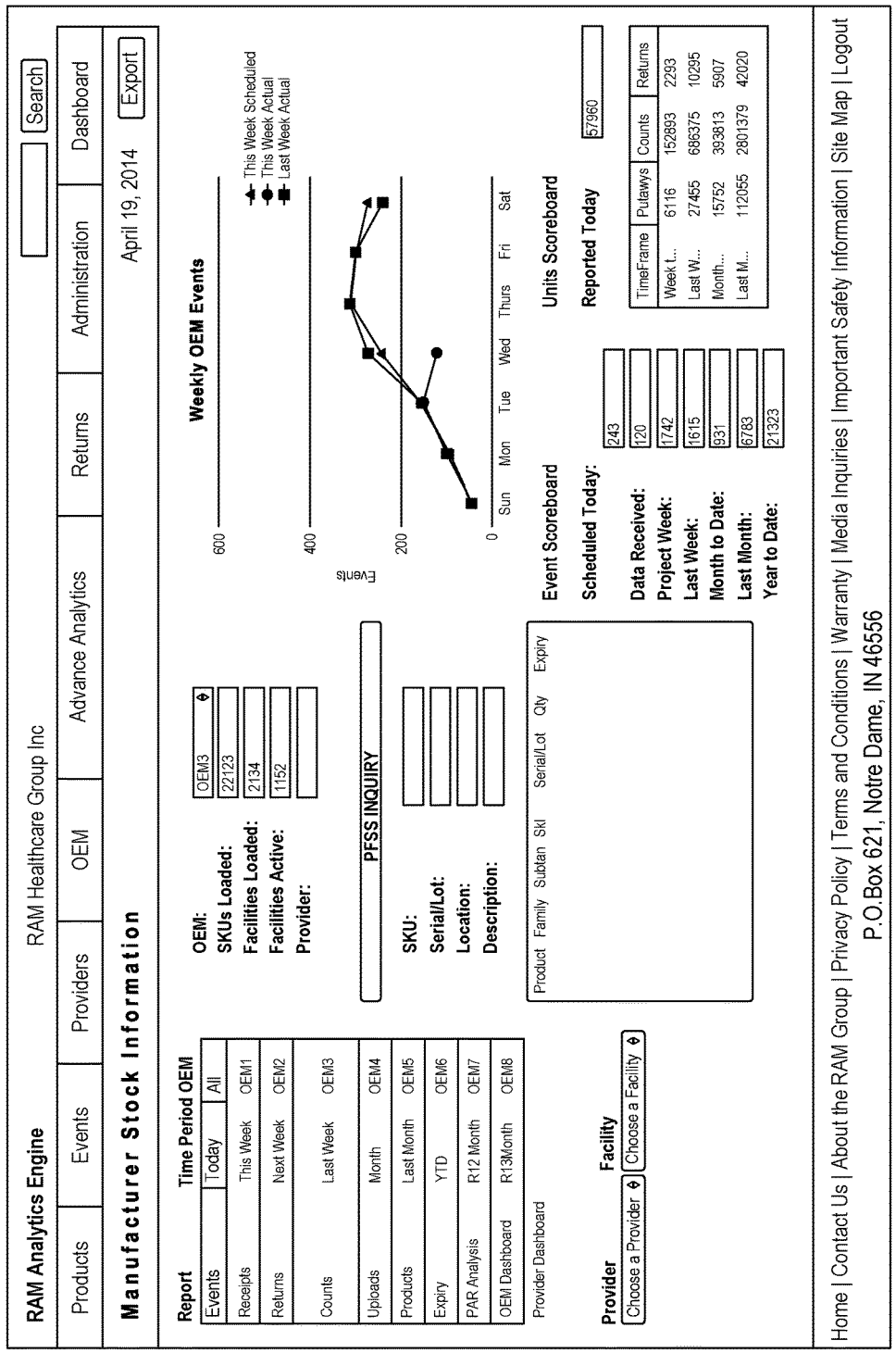

Referring to FIG. 14, upon completing an analysis of one tray, the program code can render the next tray in the given kit. Just as with the first tray, the user can select areas to represent missing items, as seen in FIG. 15, and thus, enable the program code that comprises the analytics engine to create a replenishment order for the missing items.

In a further embodiment of the present invention, the user can scan the barcode and/or read other indicia on a given kit and then use the mobile device to take a picture of each tray. The program code obtains identifying information about the tray from decoding the indicia and references a memory resource to identify the components of the kit. Utilizing image recognition capabilities, the program code receives the photographs of the trays in the kits and is able to identify the missing components and communicate this information to the server for replenishment.

Items related to the medical industry are merely offered as examples of how notes features of the present system work. As will be understood by one of skill in the art, the systems and methods disclosed herein are applicable across inventory management systems in a variety of industries, including for example retail merchandise, automotive, food service, etc.

Embodiments of the present invention can be utilized as part of business processes used to manage transactions that are specific to these high-dollar value medical devices, including but not limited to: Receipts, Transfers, Cyclecount, Damaged Product Management, Expiration Management, and Recall Management.

Sub-sets of the use of embodiments of the present invention in the above-described processes are discussed below. The specific process examples discussed where aspects of the present technique are utilized in a business process include: Surgical Product Receipt Management, Trauma Receipt Management, Surgical Product Cycle Count Management, Trauma Product Cycle Count Management, Surgical Product Returns Management, Returns Management, and OR Inventory Management. Although the examples offered are specific to the medical device industry, one of skill in the art will recognize that the technique can be adapted to accommodate additional industries. References to the surgical product management include, but are not limited to, orthopedic product management.

Surgical Product Receipt Management: Embodiments of the present invention manage Surgical product receipt management. Receipt Management is defined as the procedure of collecting, sorting and acknowledging receipt of manufacturer's product at event facilities in accordance with established standards and procedures. This process also includes putting product away onto stocking shelves in the given facility.

Before Receipt Management inventory is retrieved from the inbound OEM stocking location in the hospital or outpatient facility (collectively referred herein as "hospital"). Inventory for receipt and put-away is moved to the sterile pack stocking location in the hospital and set in a physical location away from all existing stock. The aforementioned cycle count procedure is completed for all OEM's product.

In order to initiate the procedure, a user unpacks or opens a box that was retrieved from the inbound OEM stocking location in the hospital facility. The user (e.g., an auditor) will pull up the application on the mobile computing device and launch the receipt application. Utilizing the application, the auditor will create a receipt and captures key information from the packing slip (i.e.: ASN #, Order #, ship date, and tracking number). Using the mobile computing device, the auditor scans the Product Number, the auditor scans the Lot Number, the auditor enters a quantity of (e.g., 1), the auditor puts product onto the shelf, and the auditor will proceed to the next package to be received and processes. When complete, the Auditor will close out the receipt package. Upon obtaining information that the receipt package was closed by the user, program code executing on the mobile computing device will n synchronize its local data with that on the server. The server obtains the inventory and creates a receipt "package" or event.

Trauma Receipt Management—Receipt Management is defined as the procedure of collecting, sorting and acknowledging receipt of manufacturer's product at event facilities in accordance with established standards and procedures. This process also includes putting product away onto stocking shelves in the secure facility, such as the aforementioned room in FIG. 1.

Before initiating receipt management inventory should be retrieved from the inbound OEM stocking location in the hospital facility. Inventory for receipt and put-away should be moved to the Trauma Products stocking area in the hospital and set in a physical location away from all existing stock. Generally, this area is in or near the Sterile Processing Department (SPD). The cycle count procedure, discussed later, should be completed for all OEM's product that is in scope of the program in advance of executing the Receipts Management Work Instruction.

In an embodiment of the present technique, more than one auditor can cycle count a facility, and more than one OEM's Trauma product can be included in an inventory package. It is recommended that only one auditor process a receipt package per daily inventory event.

In order to initiate the Receipt process, a user unpacks and/or opens the box that was retrieved from the inbound OEM stocking location in the hospital facility. The Auditor (user) will pull up the application and launch the receipt application on his or her mobile device. The Auditor will create a receipt and captures key information from the packing slip (i.e.: ASN #, Order #, ship date, and tracking number). The user can then begin processing parts, which includes: entering the OEM Name, Part Number and Quantity for each piece received, placing each piece into its appropriate bin, and closing out the Receipt Package.

Surgical Product Cycle Count Management: Embodiments of the present invention enable users to cycle count a manufacturer's sterile and/or non-sterilized packed Surgical product at a centralized facility and/or any number of facilities. The result of the process includes utilizing the mobile device to deliver an accounting of transactional details and send this information to the analytics engine on one or more centralized server for retention, customer reporting, and replenishment management.

In general, it is the responsibility of the Operations Manager and/or Event Associate to identify any required deviations from the standard work instruction for their event. If a question arises specific to a permanent deviation from this work instruction, the Operations Manager will document and elevate for approval.

This procedure applies to all cycle count transactions at the Provider Site, including capture of product, lot code, and expiry information.

This method, which is an aspect of an embodiment of the present invention, called Cycle Count Management, is defined as the process of organizing and the accounting of manufacturer's product at event facilities in accordance with established standards and procedures. Portions of the method are accomplished utilizing the present invention.

The method includes: 1) collecting all Receipt products and isolate from product to be cycle counted, 2) creating quarantine areas for placement of return products, 3) straightening and organize all sterile packaged products, wherein product that has sterile packaging broken or damaged should be set in quarantine area for return and product that is unidentifiable due to package damage, barcode damage or the like should be set in quarantine area for return; and 4) beginning the cycle counting process.

The mobile computing device can be utilized in the cycle counting process. A user will examine the packages expiration date and if the expiration date is later than the current date, then pull the product for return and set in quarantine area. The user can then utilize the mobile computing device to scan the barcode label for Product Number. Upon obtaining the barcode information, the mobile computing device decodes this information and program code executing on the device attempts to recognize the barcode as representing at least one product in a product database, which is accessible to the program code. If the mobile device does not recognize the scanned barcode as a valid Product Number, then the user can utilize an override function provided by the GUI and hand key the Product Number into the mobile device.

A user can further utilize the mobile computing device to scan the barcode label for Lot Number or Serial Number. If the mobile computing device (executing program code) does not recognize the scanned barcode as a valid Lot Number or Serial Number then the user can utilize an override function in the GUI to enter the Lot Number or Serial Number so it can be obtained by the program code.

In an embodiment of the present invention, a user can further utilize the GUI generated by the program code to enter a quantity, for example, "1," and proceed to next item for scan.

Efficiency in the counting process can be increased by counting left to right and top to bottom and if interrupted, place a count_card to the right of the box or container that was just counted, remaining in the area, and completing the count in advance of leaving or stopping. By utilizing more than one handheld device, more than one auditor can count an area concurrently. By utilizing an embodiment of the present invention, more than one OEM's product can be counted concurrently.

When utilizing an embodiment of the present invention relevant to medical device inventory management and related products, the program code makes certain distinctions in order to improve processing. For example, if there is a sterile packed Surgical product to be received into inventory, then proceed to the Inventory Receipt transaction Work Instruction WI0003-Ortho. Also, if there is no sterile packed surgical product to be received into inventory, then Sync the mobile computing device to the corporate server upon completion of the cycle count process. Cycle count information may be available to OEM or Provider via the analytics engine after completion.

Trauma Product Cycle Count Management: Cycle Count Management is defined as the process of organizing and the accounting of manufacturer's product at event facilities in accordance with established standards and procedures. The present technique enables a user to "stick count" all trauma trays at each facility for the OEM product. Stick Counting is simply identifying the OEM Name, the Trauma Tray Model Name (each tray has a Model Name), and a count of 1 (for the Tray). Most Trauma Tray's will be sterile wrapped in a blue, cloth wrap. This wrap is not to be removed by an Auditor, thus the stick count method for capturing the number and type of trays in the facility for each manufacturer.

The program code works within the constraints of best business practices which include the following circumstances: 1) The Trauma Tray will be replenished by the Sterile Processing Department at the facility; 2) The Trauma Cabinets are managed centrally; 3) Trauma Cabinets are where the individual screws, plates and other trauma product are located.

Generally, trauma product located in the Trauma Cabinets will be individually wrapped in small plastic packages with a product number located on the plastic packaging. This product will be counted by an Auditor. The Auditor will also be responsible for pulling any product that requires return, ensuring product is properly.

Cycle counting trauma product includes collecting all Receipt trauma products and isolating from product to be cycle counted. Cycle counting also includes creating quarantine areas in a sterile environment, such as the room described in FIG. 1, for placement of return products. In some cases, Trauma product will not be stored in room of FIG. 1. However, product that is to be returned should be segregated away from inventory that will remain at the hospital, including inventory that has been received and awaiting processing and put-away.

To utilize an embodiment of the present technique to cycle count trauma product the user may count all sterile wrapped product by entering or selecting the OEM Name in a GUI generated by program code, entering or selecting the Model Name, and entering the quantity (e.g., 1) for each Tray. The Auditor (user) may enter a number greater than 1 if there are multiple Trays that are of the same OEM Name and Model Name. The user can continue to utilize the present system in this manner until all processing is complete.

The user (e.g., Auditor) can also utilize aspects of an embodiment of the present invention by utilizing the mobile computing device to count product in Trauma Cabinets. In the Cabinet, there will be boxes of product. Each box contains one unique product number or part. The user can Count the number of parts in each box and make sure that parts are not mixed. If a part is found in the incorrect bin, then the user can pull it and set it aside to be counted later and to be returned to its correct bin or box. When finished counting the parts in the box, the user can enter the OEM Name and Part Number, along with the quantity counted, into the GUI on the mobile computing device upon which program code is executed by one or more processors. The user can continue processing the Trauma Cabinet until complete.

The user can utilize the software to count product that was pulled from Cabinets due to being misplaced. To do this, in an embodiment of the present invention, the user can utilize the GUI to enter the OEM Name, Part Number and unit count for each misplaced item. The user can utilize the software to find the location in the Cabinet that each piece belongs in order to put each piece back into its proper stocking bin or box. After completing this operation, the user may close the Cycle Count operation on the mobile computing device.

Surgical Product Returns Management: Returns Management is defined as the process of collecting product at a customer facility that requires being returned to the OEM due to one of three primary reasons. Primary reasons for product return are: Product is damaged (Return Code="Damaged"); Product is expired (Return Code="Expired"); Product has been pulled for transfer (Return Code="Transfer").

Before utilizing aspects of the present technique in the returns management process, a number of business process steps can be performed. For example, inventory should have been retrieved from the inbound OEM stocking location in the hospital facility. Also, inventory for receipt and put-away should be moved to the sterile pack stocking location in the hospital and set in a physical location away from all existing stock. Also, the process of pulling returns is the first process step in performing an inventory service at a facility as the actual processing of returns is the final step.

More than one auditor can cycle count a facility, and more than one OEM's sterile packed product can be included in an inventory cycle count package. It is recommended that only one auditor process a returns package per daily inventory event. Also, product being pulled for return should only be for "in-scope" OEM product so that there is record of the product in the memory resources of the system.

Before initiating returns, the user may visually inspect the product located on the shelves and pull any product for return where the sterile wrapping on the box has been damaged, opened or penetrated in any way, the expiration date on the box is later than the current date, and/or the label on the package is un-readable. The user may also set this product aside in a quarantined returns area for later processing. The user may utilize the mobile computing device and software to complete the aforementioned Cycle Count. While executing the Cycle Count, the Auditor (user) may be notified by the application to pull a product from the shelf and sent back to RAM for returns processing. The program code will cause the mobile device to generate an audible and/or visual signal when encountering this scenario, in order to alert the user. When the user received the alert, the user will know to pull the product from the shelf and placed it in the Returns quarantined area for return. Upon completing the Cycle Count, the user can utilize the software to complete Receipts processing.

In order to initiate the returns process, in an embodiment of the present invention, the Auditor will pull up the application and launch the returns application. The Auditor will create a return and captures key information specific to the location from which the return is being shipped (i.e.: Customer #, ship date, and tracking number). The auditor will utilize the mobile computing device to scan the Product Number. If the Product Number is not available or legible, then the Auditor can enters Description of item through the GUI.

Utilizing the mobile computing device, the Auditor can scan the Lot Number, if available. The Auditor enters a quantity. The Auditor puts product into the shipping box and continues to the next item for return. When complete the Auditor will close out the returns package. The Auditor will then sync the mobile computing device's local database to the corporate server. The Auditor can place a pre-printed label onto the box and the box should be taken to the shipping dock of the facility for shipping, for example, back to a centralized Distribution Center.

Returns Management—Returns Management is defined as the process of collecting product at a customer facility that requires being returned to the OEM due to one of three primary reasons. Primary reasons for product return are: Product is damaged (Return Code ="Damaged"); Product is expired (Return Code="Expired"); and/or Product has been pulled for transfer (Return Code="Transfer").

Before utilizing the software to practice aspects of the invention, the user (auditor) can first retrieve inventory from the inbound OEM stocking location in the hospital facility, move inventory for receipt and put-away to the sterile pack stocking location in the hospital and set in a physical location away from all existing stock. The process of pulling returns is the first process step in performing an inventory service at a facility, the processing of these returns by the software is the last step.

As with other procedures described, more than one auditor can cycle count a facility, and more than one OEM's sterile packed product can be included in an inventory cycle count package. It is recommended that only one auditor process a returns package per daily inventory event. Product being pulled for return should only be for "in-scope" OEM product, meaning that there is data related to these products that is retained on a memory resources in the system.

In an embodiment of the present technique, before scanning the products, the user visually inspect the product located on the shelves and pull any product for return where the sterile wrapping on the box has been damaged, opened or penetrated in any way, the expiration date on the box is later than the current date, and/or the label on the package is un-readable. The user sets this product aside in a quarantined returns area for later processing. The user then utilizes the software on the mobile computing device to complete a Cycle Count.

In an embodiment of the present invention, while executing the Cycle Count, the Auditor (user) may be notified to pull a product from the shelf and sent back to RAM for returns processing. This notification is from the software, which obtains the identification information from the scan, references a memory resource, and determines that the item should be returned based on the data retrieved. For example, the data retrieved could indicate that the product has expired. To notify the user of this issue, the program code can send the user (e.g., Auditor) an alert. This alert could be an audible and/or visual signal from the mobile computing device. When the user receives this alert, the user should pull the product that generated the alert from the shelf and place it in the Returns quarantined area for return. The user can then utilize the present invention to complete Receipts processing, as explained.

The complete the returns process using the application on the mobile computing device, the Auditor (user) will pull up the application and launch the returns application. The Auditor will create a return and captures key information specific to the location from which the return is being shipped (i.e.: Customer #, ship date, and tracking number). The Auditor will scan the Product Number. If the Product Number is not available or legible, then Auditor enters Description of item. The Auditor will scan the Lot Number, if available. The Auditor will enter a quantity (e.g., 1). The Auditor will put product into the shipping box and continue to the next item for return. When complete the Auditor will close out the returns package. The Auditor will then sync the mobile computing device to the corporate server. The Auditor can place a pre-printed label onto the box (the label being generated by the software) and the box can be taken to the shipping dock of the facility for shipping back to, for example, a central Distribution Center.

Examples of the processes discussed above are also depicted in FIGS. 16-19. FIGS. 20-25 are screenshots from a GUI of an embodiment of the present invention that shows the system from the user perspective and how a user interacts with the functionality supplied by the application.

As aforementioned, aspects of the present invention are particularly beneficial to user in an OR setting. Thus, embodiments of the present invention may include a module tailored to the OR environment, but as will be understood by one of skill in the art, techniques of this aspect of the invention may also be applied in additional settings with similar inventory management demands.

OR Inventory Management—OR Inventory Management is an inventory management and control solution set by capturing consumption of materials in the OR at time of completion of the OR procedure or case. A qualified user in the OR setting, including but not limited to a Sales Rep., and/or an OR Nurse, may use this functionality to capture inventory consumed during a surgical procedure. By capturing inventory use during a surgical procedure, a full-cycle count during each service event is no longer needed to track the inventory. By utilizing this functionality, a full cycle (physical) count can occur less frequently, for example, as a monthly event or a quarterly event, with a reconciliation capability built in.

In an embodiment of the present invention, this functionality is accessible to a user by connecting to a secure website wherein the software identifies the user and the location where the relevant inventory is located. In an embodiment of the present invention, the user may be required to enter a user name and a password and/or additional identifying information to gain access. In an embodiment of the present invention, product information can be entered into the secure web interface by scanning a bar code, or reading other indicia on the item. From this indicia collected by an EIR device communicatively coupled to a processor, in communication with the web interface, computer code that comprises the web interface may identify a product.

In an embodiment of the present invention, the secure web interface comprises a help portal that enable a user to receive in-line help. The on-line help resources may include tutorials and videos.

In an embodiment of the present invention, the OR Inventory Management aspect of the present invention includes at least one memory resource with information about past surgeries that can be filtered by patient id, surgeon name, date range and administrator. When a user in an OR utilizes the application to track inventory during a procedure, the present invention can be configured to display most current surgery procedure records. An embodiment of the present invention includes further filtering capabilities that enable data to be reduced to desired items and to display the results in grids or other formats that can be understood easily by a user.

In an embodiment of the present invention, the GUI used for OR Inventory Management includes an input (such as a button rendered on a screen), to enable a user to make an entry. Because of the time constraints of users working in an OR, an embodiment of the present invention utilizes the aforementioned memory resources to pre-populate data by matching on data entries by the user. Information collected for a given surgery may include, but is not limited to: Date/Time of surgery, Patient unique ID (to protect the privacy and comply with privacy regulations, embodiments of the present invention will not track patient-specific data that would enable individuals using the system to identify the patients), Surgeon Name, Sales Rep Name, Sales Rep ID, Manufacturer Utilized (OEM), Provider Location (may be inclusive of all locations to a particular chain). Product information tracked within an embodiment of the present invention may include, but is not limited to: Product ID, Product Name and Description, and Quantity.

In an embodiment of the present invention, users utilize the OR Inventory Management capabilities of the invention and enter inventory-related about products that are billed to a given case (i.e., product that was opened and not used in the surgical procedure, or product that is considered "non-inventory" is not entered. Similarly, this aspect of the application may not be utilized to enter a product where a sterile barrier breached or requires being returned to the OEM for any other reason. This type of product would be returned utilizing functionality described in other sections of this document.

In an embodiment of the present invention, the computer code approves a transaction and based on this approval, the transaction will decrement the inventory on-hand for the relevant location, for this OEM, and for this SKU number. The computer code tracks the status of various transactions and users can observe the status through the computer code's use of a status flag to each inventory transaction record. The flag represents the transaction's state. Valid values include, but are not limited to, are: Inserted, Inventory Processed, Sent for Billing. Based on approval of a transaction, the computer code may send a transaction to the listed OEM, so that the OEM can bill for the consumed product.

Entry of product information in the OR environment can be handled in a variety of different ways. The computer code can obtain this product information through manual entry and lookup if information using type ahead feature (type ahead functionality will search customer product id, Product Name and descriptions), scanning product bar codes or other indicia (e.g., RFID). In an embodiment of the present invention, users may manually adjust quantities. In an embodiment of the present invention, a secure approval-process based on business rules is implemented by computer code such that replacement products are not ordered until consumption is approved in the system by an authorized user.

In an embodiment of the present invention, a user may identify which products are consumed in an OR setting (or any setting) by utilizing visuals of the kits displayed by the invention. This interface was discussed in other sections, however, in an embodiment of the present invention, a user may utilize this feature to replenish items used in an OR setting by pulling up a visual to select products used from a kit. As discussed earlier, all products visually selected may be added to a consumption list by the present system and method. Other features of the present invention include, but are not limited to, a search feature enabling a user to search for kits (or other products) by keyword, name or product id, a select feature that enables a user to select item on picture, wherein the software will obtain the selection and display information about the selected product, including but not limited to ID, Name, Description and/or Quantity.

As aforementioned, scanning barcodes for individual items can be time-consuming. Thus, as embodiment of the present invention includes a facility for capturing and utilizing a digital image to assist in inventory management. FIGS. 26-30B illustrate aspects of this functionality.

Figure 26:
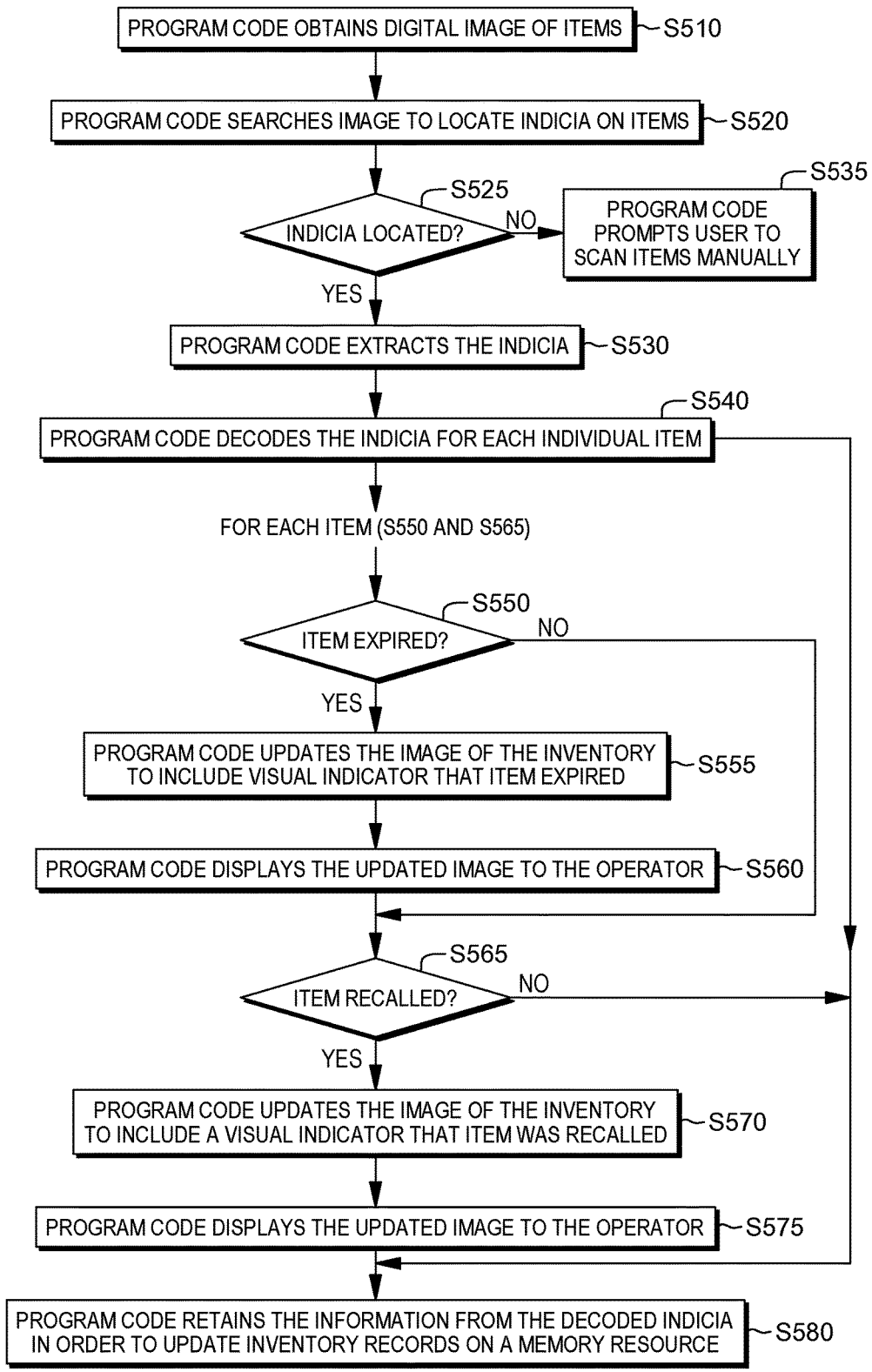
FIG. 26 depicts a workflow of an embodiment of the present invention.

FIG. 26 is a workflow of an embodiment of the present invention. The method and system, an embodiment of which is demonstrated in this flow chart, can be referred to as an Advanced Vision System. In an embodiment of the present invention, a mobile device 120 is utilized by a user (auditor) to capture the data from a group of items with encoded indicia in bulk, and is retained for local information and/or sent to a centralized repository, such as server 110, for inventory management. Indicia are also referred to herein as symbols of decodable indicia, which include bar codes, QC codes, and such indicia utilized in the labeling of items.

Before data from the packaging of inventory items is captured, it may be advantageous to align the items in a manner in which any indicia on the inventory, including but not limited to, bar codes, are visible from a given perspective from which a user of the EIR device can capture an image including the indicia.

Referring to FIG. 26, the EIR device obtains a digital image of a group of items to be inventoried. In an embodiment of the present invention, the digital image is obtained in black and white. In a further embodiment of the present invention, the image is obtained at a high resolution. A processor on the mobile (e.g., EIR) device executing computer code (program code, software) obtains the digital image (S510). The computer program code (executing on the processor) searches the image to locate the indicia on the inventory item packaging in the image (S520). Based on locating the indicia, the program code extracts the indicia (e.g., the bar codes) (S530). In the event that the mobile device does not locate any bar codes or other indicia in the captured image, the program code may prompt to user to scan each inventory item manually (S535).

The program code decodes the indicia (S540). The data decoded may include, but is not limited to OEM name, part number, lot and/or serial number, quantity, and/or expiration date. As noted, other product-related information may be captured from the bar code labeling as well.

Based on the data from the indicia, the program code determines whether the inventory item associated with each bar code has expired (S550). If a given item has expired, the program code updates the image of the inventory to include a visual indicator relative to the portion of the image that depicts the expired item to show that the item associated with a given bar code has expired (S555). The program code displays the updated image to the operator (S560), for example, on the mobile device in a GUI on the mobile device. In an embodiment of the present invention, the visual indicator is a red box around the expired item in the image. In an embodiment of the present invention, the program code displays the image during the process and updates the image each time an additional item is indicated as expired. In a further embodiment of the present invention, the program code displays the image with all indicators after the expiration dates associated with all the bar code data in the image have been evaluated.

Based on the data from the indicia, the program code determines whether the inventory item associated with each bar code has been recalled (S565). In an embodiment of the present invention, the program code makes this determination by accessing information relating to each inventory item retained on a memory resource accessible to the processor executing the program code. The memory resource may be internal and/or external to the mobile device. If a given item has been recalled, the program code updates the image of the inventory to include a visual indicator to show that the item associated with a given bar code has been recalled (S570). The program code displays the updated image to the operator (S575), for example, on the mobile device in a GUI on the mobile device. In an embodiment of the present invention, the visual indicator is a red box (or another color, including a color that is different from the color utilized for an expired item) around the recalled item in the image. In an embodiment of the present invention, the program code displays the image during the process and updates the image each time an additional item is indicated as recalled. In a further embodiment of the present invention, the program code displays the image with all indicators after the recall information associated with all the bar code data in the image has been evaluated.

In an embodiment of the present invention, the program code displays expiration information and recall information in the same image. In a further embodiment of the present invention, the program code may display recall and expiration information in separate images and enable to user to toggle between the two images and/or overlay one image on the other. In an embodiment of the present invention, expiration and recall updates may occur as the bar code information is evaluated by the program code and/or a single update to the image may occur after all the bar code information from a given image has been evaluated for expiration and/or recall of the inventory items pictured.

Returning to FIG. 26, the program code retains the information from the decoded indicia in order to update inventory records on a memory resource (S580). As represented in FIG. 26, the program code can retain information from the decoded indicia at various points during the process. One of skill in the art will recognize that even FIG. 26 is representative of possible timing for retention of information. The program code can store the inventory information on a local memory resource, or, referring to FIG. 1, the mobile device 110 can send this information to the server 120, which may house a centralized database of inventory. The program code executing on the server 120 can obtain this information and utilize it to update inventory records on a centralized memory resource.

Figure 27:
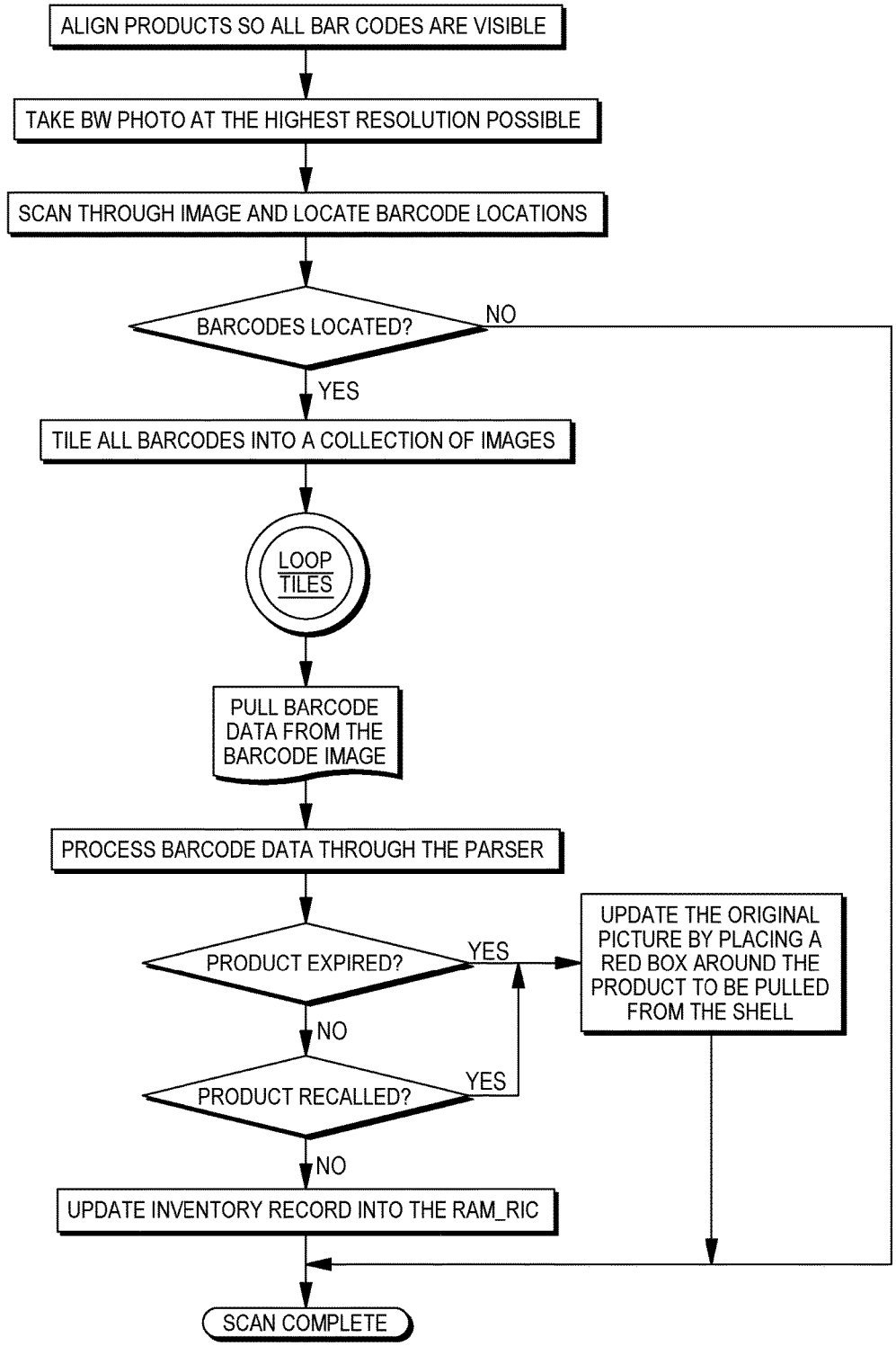
FIG. 27 depicts a workflow of an embodiment of the present invention.

As described in FIG. 26, an embodiment of the present invention may be utilized to capture digital images of numerous sterile packed, inventoried implants or other medical devices and to convert these images to their numerical inventory record representations. FIG. 27 is an alternate representation of aspects of the described process. In FIG. 27, when the program code has located the indicia in the image, the program code tiles the indicia into a collection of images and loops the individual tiles in order to decode the data in the individual indicia. Although the medical implant industry is used as an example of an application of the system and method, one of skill in the art will recognize that the present system and method may also be utilized with different type of commercial products to be inventoried, provided that the products are marked with indicia.

Figure 28:
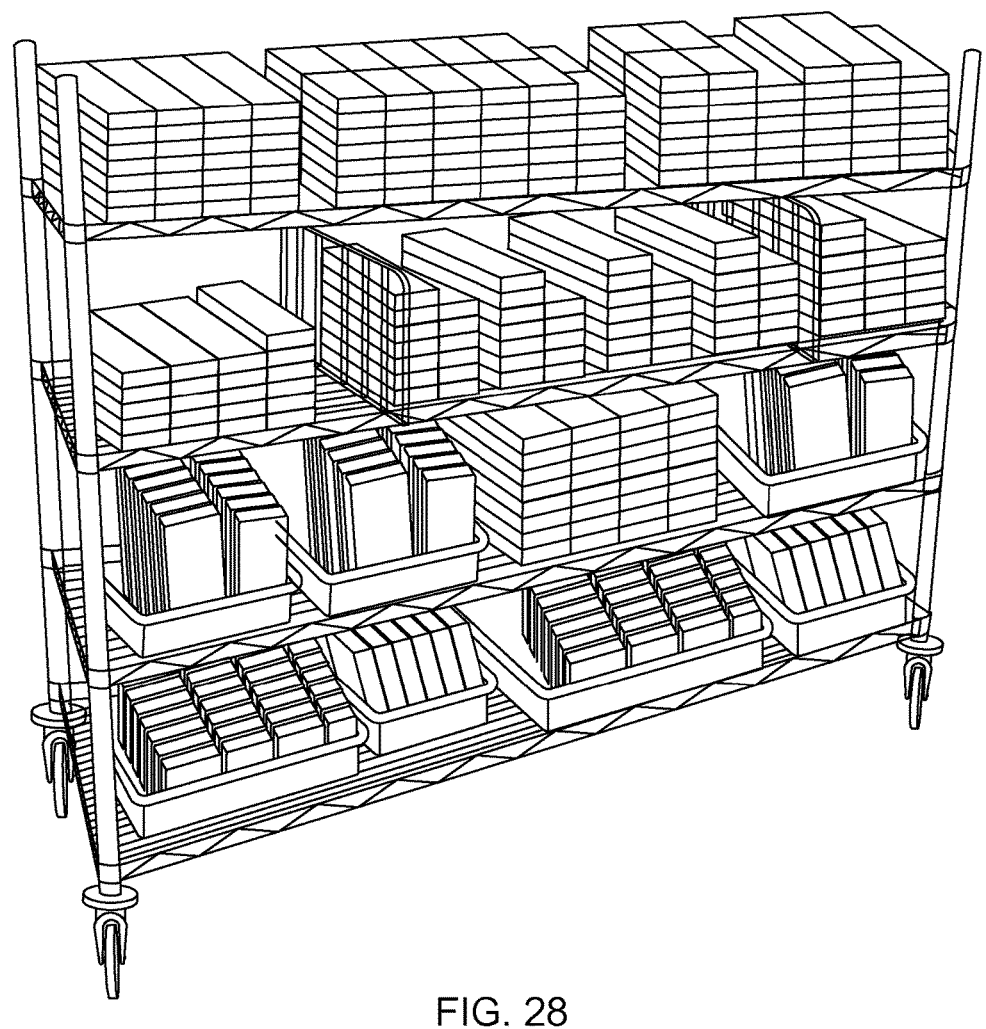
FIG. 28 depicts aspects of a physical environment where aspects of the disclosed system and method may be employed.

In applications involving inventoried implants, generally "sterile packed" medical devices packed (and sterilized) in a box or container with bar code information on the outside of the box, indicia captured in digital images and ultimately decoded by an embodiment of the present invention may include, but is not limited to, bar codes, including HIBC, GTIN, QR Code, Aztec, or any bar code whether standard or non-standard. The digital image capture is effective in capturing the bar codes on the items because boxes of implants are generally stacked on mobile racks, as depicted in FIG. 28. The described method therefore enables an auditor (operating the described mobile device) to take a picture of a shelf section. Upon obtaining the image, the software will then convert the bar code information for each item in the picture to its correct data representation for each package in the section, and store this information. The information may be stored locally on the device, and/or may be transmitted to a centralized Analytics Engine.

Figure 29:
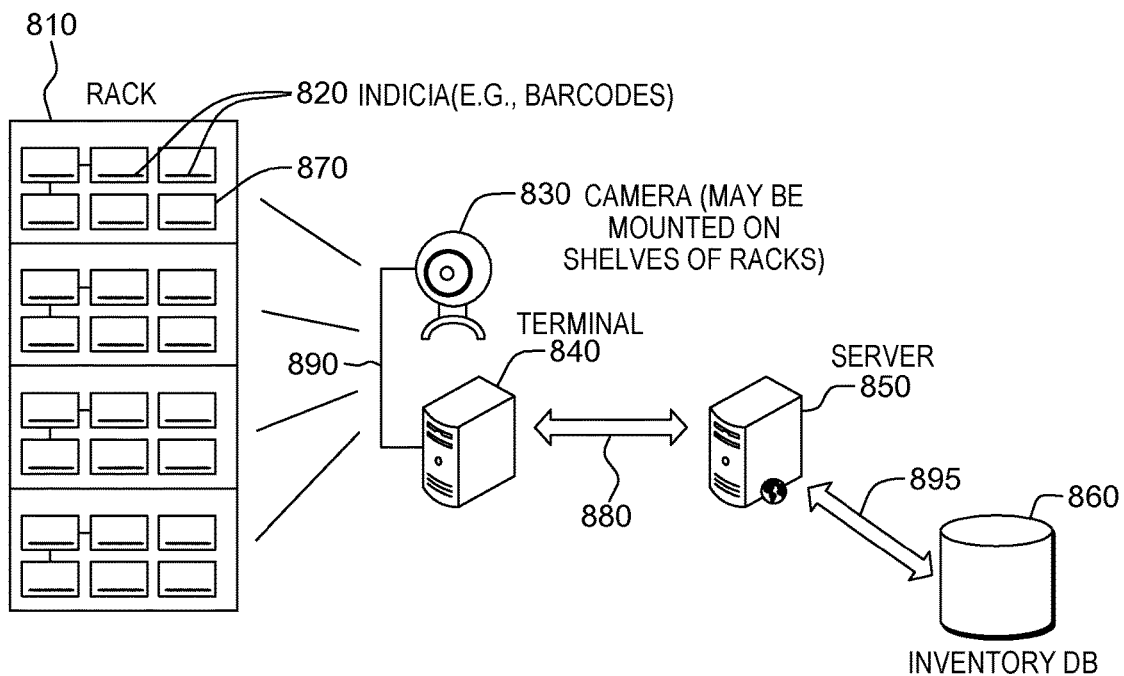
FIG. 29 depicts one example of aspects a computing environment used to execute one or more aspects of an embodiment of the present invention.

The system described in FIG. 1 incorporates the image capture functionality into a mobile computing device 120, including but not limited to, an EIR terminal, such as that of FIG. 2. However, in another embodiment of the present invention, one or more image capture devices are mounted on racks (or another storage structure) that hold the objects to be inventoried. For example, one or more cameras can be mounted on the rack in FIG. 28. FIG. 29 depicts elements of a system utilizing a mounted stationary image capture device, such as a camera, to inventory objects on a rack.

Referring to FIG. 29, one or more cameras 830 are mounted on a rack 810. The camera(s) 830 and the objects 870 on the rack 810 are positioned in a manner so that the camera(s) 830 may capture the decodable indicia 820, such as bar codes, displayed on the objects 870. In an embodiment of the present invention, the camera(s) 830 mounted on the rack 810 may take a picture of the objects 870 content on the rack 810.

In the system of FIG. 29, a terminal 840 (computer resource) obtains the images from the mounted camera(s) 830. The terminal 840 may be located in close physical proximity to the rack 810 and camera(s) 830, or it may communicate with the camera(s) 830 over a communications network 890. In an embodiment of the present invention, program code executed by a processor in the terminal 840 processes the images captured in the manner described in FIG. 26. The program code extracts inventory information from the images and communicates this information, over a network 880 to a server 850. The server 850 saves the inventory information in memory device, such as a database 860, and communicates with this device over a network 895. In a further embodiment of the present invention, the memory device where inventory information is retained and maintained may be internal to the server 850.

In a further embodiment of the present invention, the terminal 840 may obtain the images, but the program code that extracts the inventory information may be executed on the server 850. Thus, the terminal 840 would obtain the images and communicate images over a communications connection to a server 850, which would then process the image data and save the resultant inventory information on the database 860.

The server 850 may be located on site with the terminal 840, when the terminal 840 is located at the same physical location as the rack 810, or the server 830 may be centrally located so that it can connect to multiple terminals like terminal 840 and obtain images and/or inventory data from cameras on racks at various locations.

In an embodiment of the present invention, the image capture functionality of the camera(s) 830 is scheduled using a computer resource that then triggers the image capture. In an embodiment of the present invention, the image capture is scheduled at a centralized location using the server 850, or a computing device (not pictured) that is connected to the server 850. The server 850 communicates the request to trigger the image capture to the terminal 840, which communicates with the camera(s) 830. Upon receiving this communication, the camera(s) 830 capture images of the rack 810. In a further embodiment of the present invention, the image capture is schedule by a user through a graphical user interface (GUI) and/or input/output device at the terminal 840.

An advantage of automating the image capture is that it may further reduce the time of a human auditor in managing inventory.

Figure 30A:
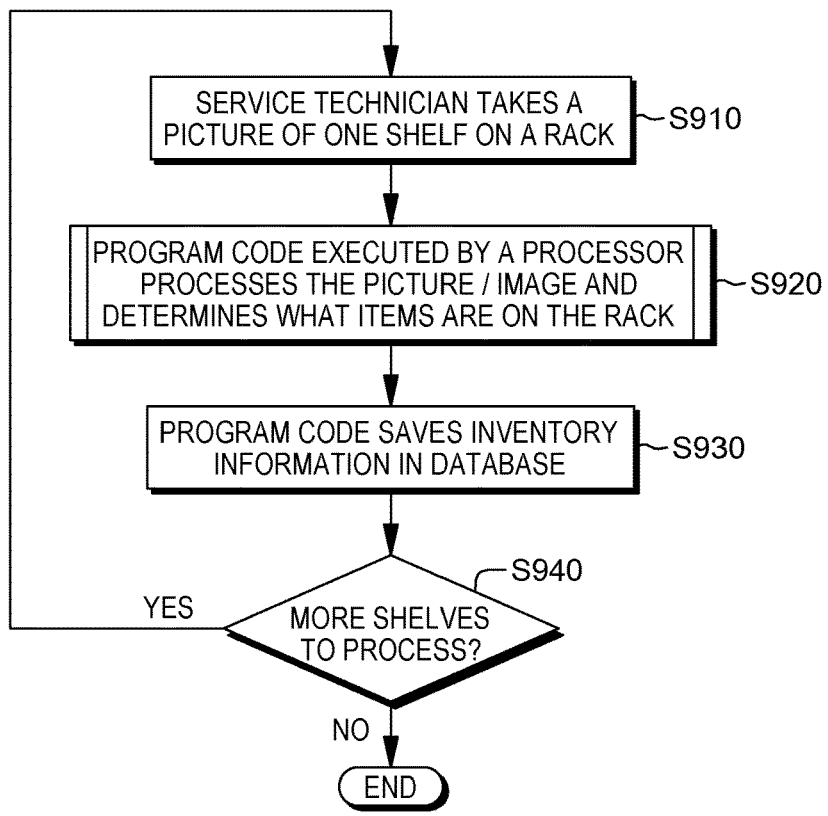
FIGS. 30A-30B depict two workflows associated with at least two different embodiments of the present invention.
Figure 30B:
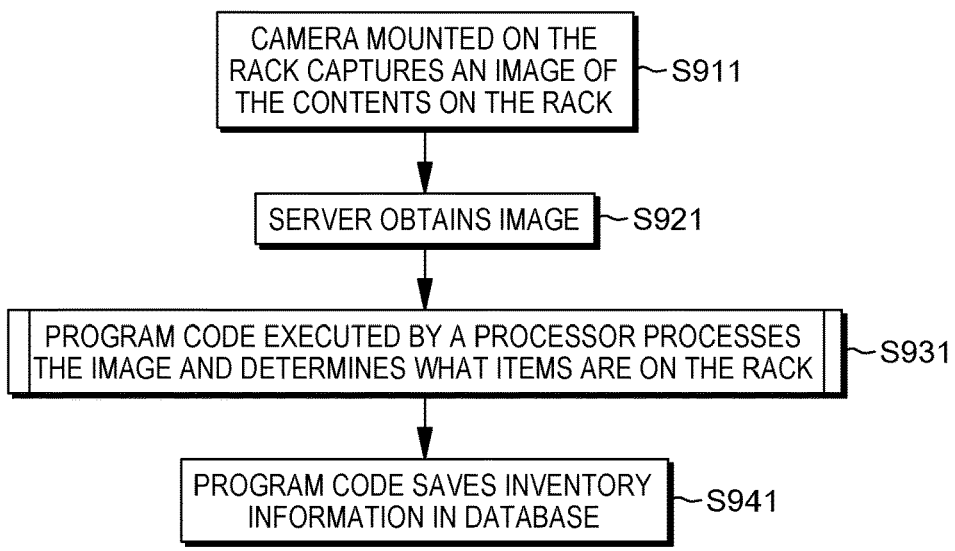

FIGS. 30A-30B contrast two approaches that utilize aspects of embodiments of the present invention. In FIG. 30A, the image capture is handled manually by a technician. In FIG. 30B, the image capture is handled by a mounted camera that is controlled remotely, like in FIG. 29.

Referring first to FIG. 30A, a service technician takes a picture of one shelf on a rack (S910). The program code executed by a processor will process the picture (as described in FIGS. 26 and 27) and determine what items are on the rack based on the interrogation of the barcodes on the items on the shelf, on the rack (S910). Inventory information is stored in a database by program code executing on the server (S930). Upon completing the processing of the inventory on one shelf, the Service Technician would then proceed to the next shelf, and the next rack, and so on (S930) until the inventory of all shelves and/or racks is processed.

Referring now to FIG. 30B, a camera mounted on the rack captures an image of the contents on the rack (S911). In this embodiment of the present invention, this process is initiated by a remote system call to the camera, is scheduled from a remote server. The picture is obtained by the server (S921). Program code executed at the server processes the image to determine what items are on the rack based on the interrogation of the barcodes on the items on the shelf, on the rack (S931). Inventory information is stored in a database (S941).

The processes described in FIGS. 30A and 30B are not mutually exclusive and can both be utilized to inventory objects at various locations.

Benefits of utilizing the described system and method for inventorying commercial products, including but not limited to, sterile packed medical devices, include: 1) increasing speed by significantly reducing the auditor's time investment in securing the critical information contained in the bar codes located on the outside of the implant boxes; 2) increasing accuracy by reducing human error introduced when scanning an individual box is accidentally skipped by an auditor.

As discussed earlier, a benefit of embodiments of the present invention, is that it presents users with a faster and more efficient way to enter and locate information to assist the user in inventory management. FIGS. 31-36 are examples of interfaces encountered by users of embodiments of the present invention that highlight the ease of use of the features of the interface available to the user. In these examples, for ease of understanding, the inventoried items are surgical kits which contain trays with multiple components. But as understood by one of skill in the art, the interfaces and functionality depicted in these examples are applicable across inventory management in multiple industries for multiple product types.

Figure 31:
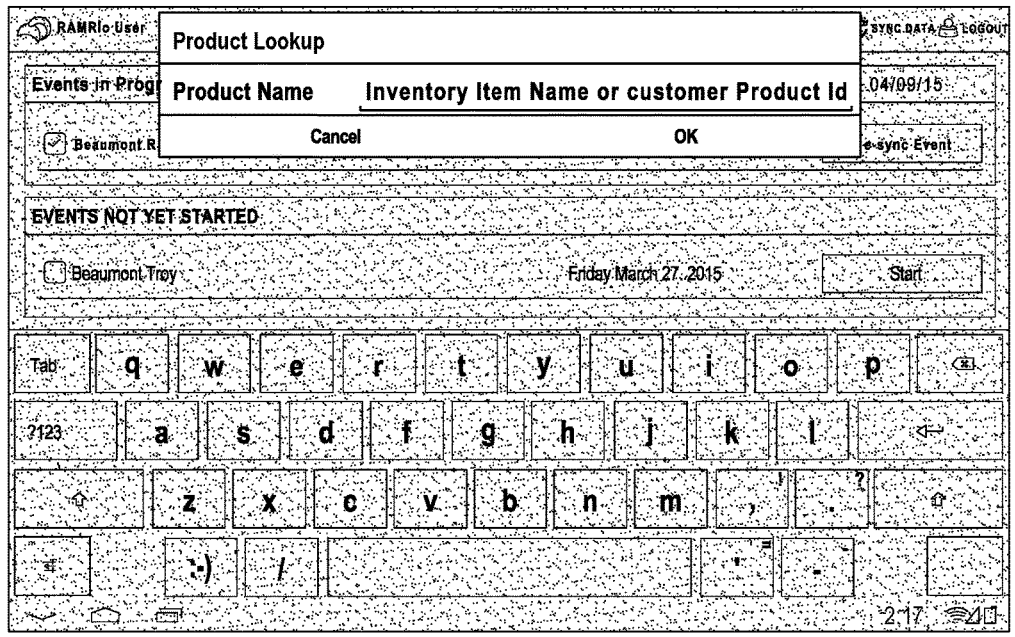
FIGS. 31-36 depict examples of screenshots of a GUI that depicts aspects of an embodiment of the present invention.

FIG. 31 displays an interface that a user may utilize to search for a product that includes items that need to be restocked. As seen in FIG. 31, a user may look up the product using a variety of criteria, such as inventory item name, or customer product id. Embodiments of the present invention can be configured for searching on a variety of criteria, those in FIG. 31 are non-limiting examples.

Figure 32:
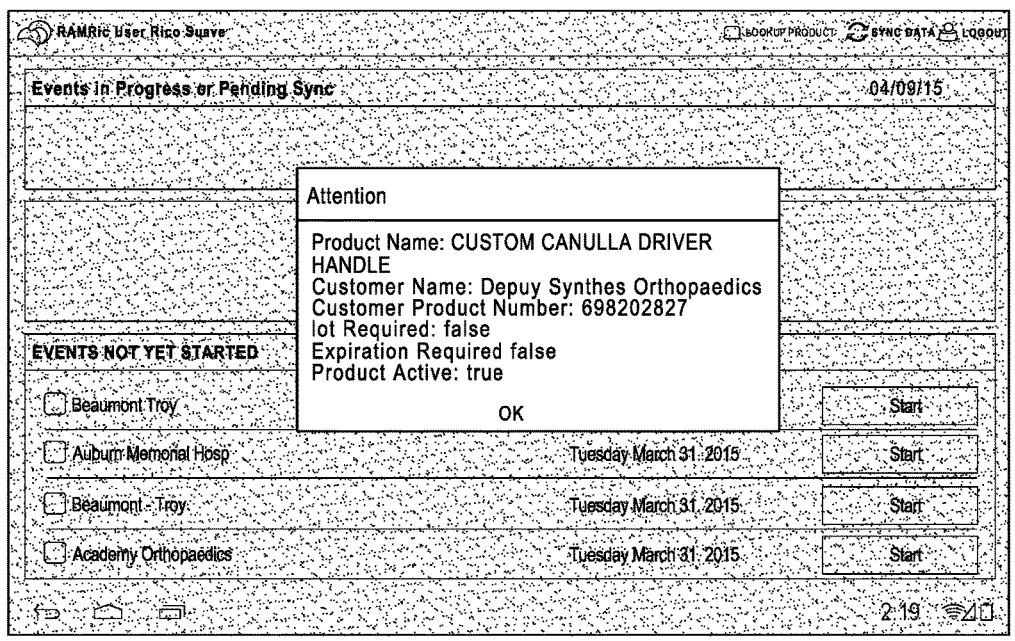

FIG. 32 is an example of product information displayed to the user after a user enters information (and/or utilizes and EIR terminal to scan a signal of decodable indicia, an RFID, and/or a barcode). As the information about the product is displayed to the user, the user may confirm that the selected product is correct.

Figure 33:
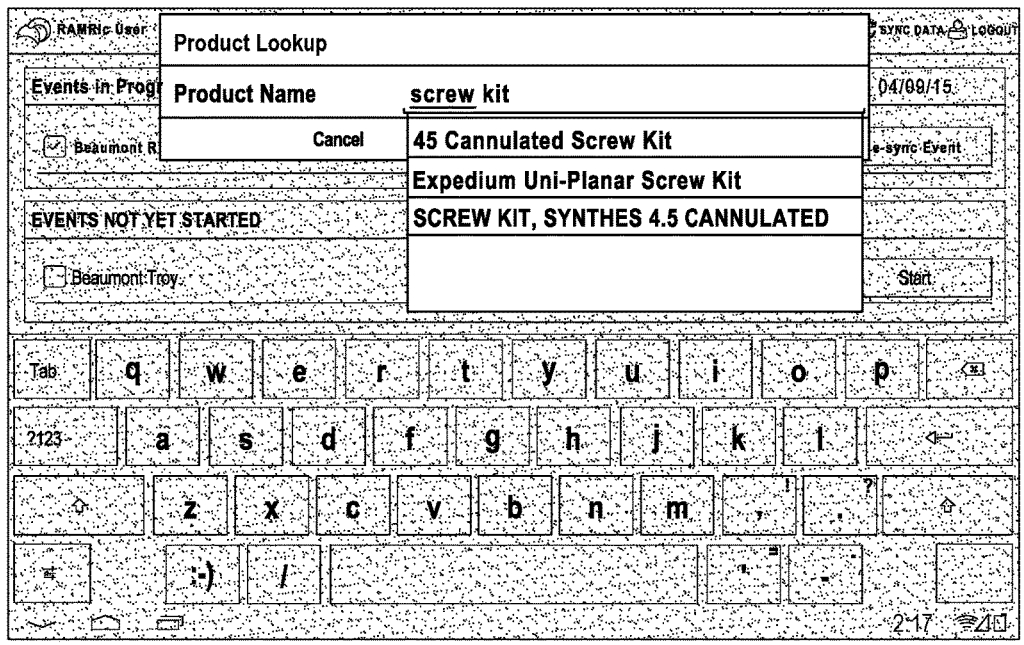

FIG. 33 is an example of a lookup screen in an embodiment of the present invention that enables a user to look up a product based on the name of the product. As seen in the example, the user can enter only a portion of the product name and the computer code executing on a processor to create the interface can match the entry and suggest like terms from those stored on the computer system, for example, in a memory and/or a flat file.

Figure 34:
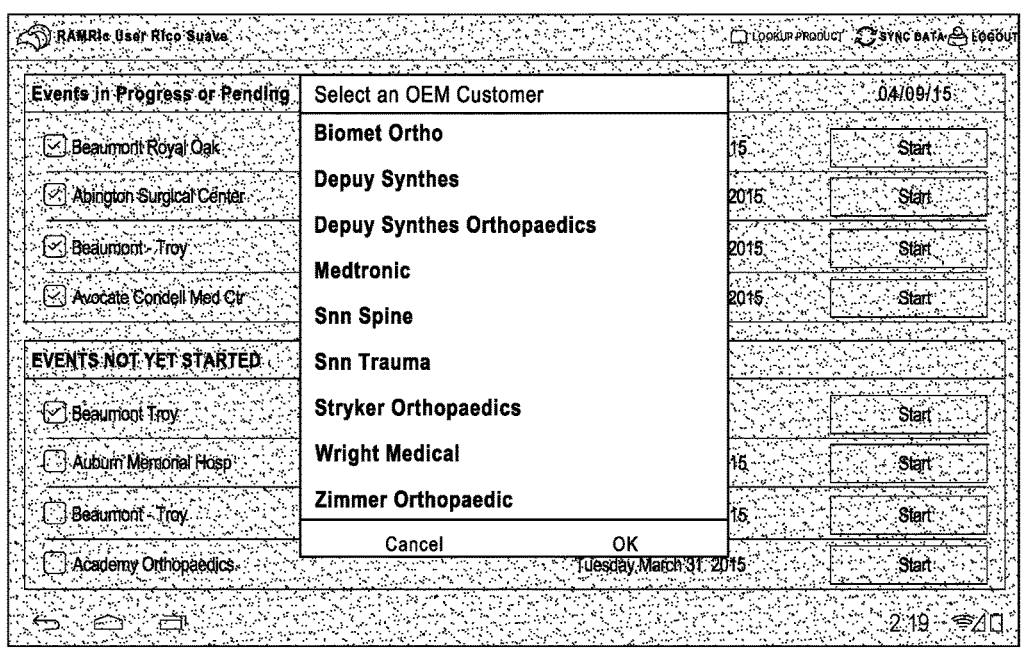

FIG. 34 is an example of a lookup screen in an embodiment of the present invention that enable a user to select the OEM associated with the product and/or customer.

Figure 35:
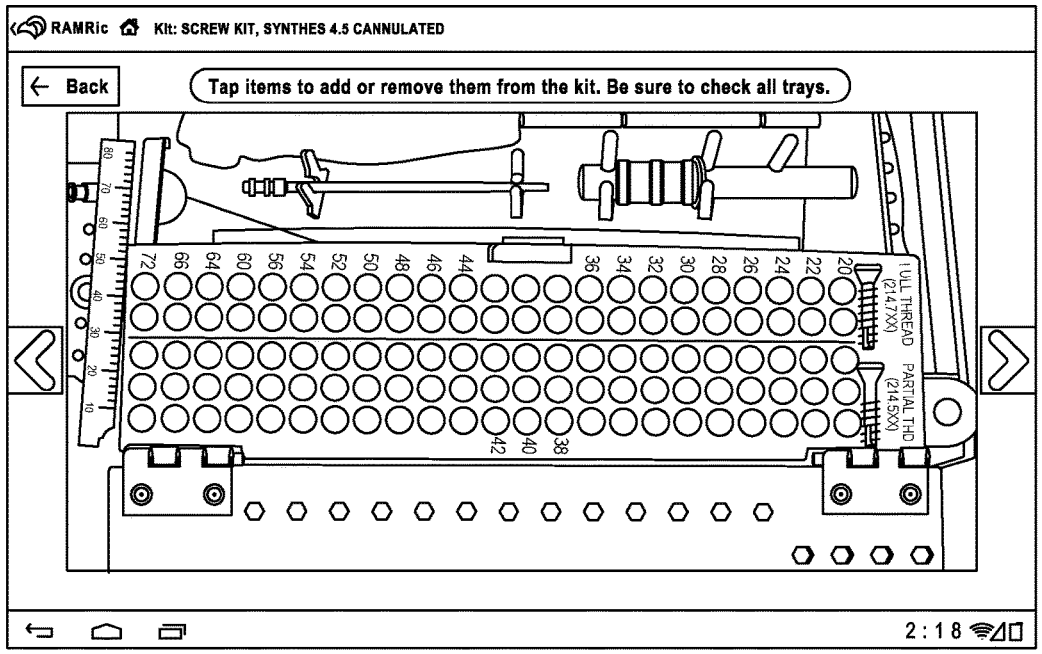

FIG. 35 is an example of a visual display of a product in an embodiment of the present invention. The product is displayed such that the items that comprise the product may be selected by the user to indicate that these items have been used. The visual rendering enables the user to easily note the used inventory in the product. By selecting regions of the image, the user is indicating what items have been used and should be re-ordered.

Figure 36:
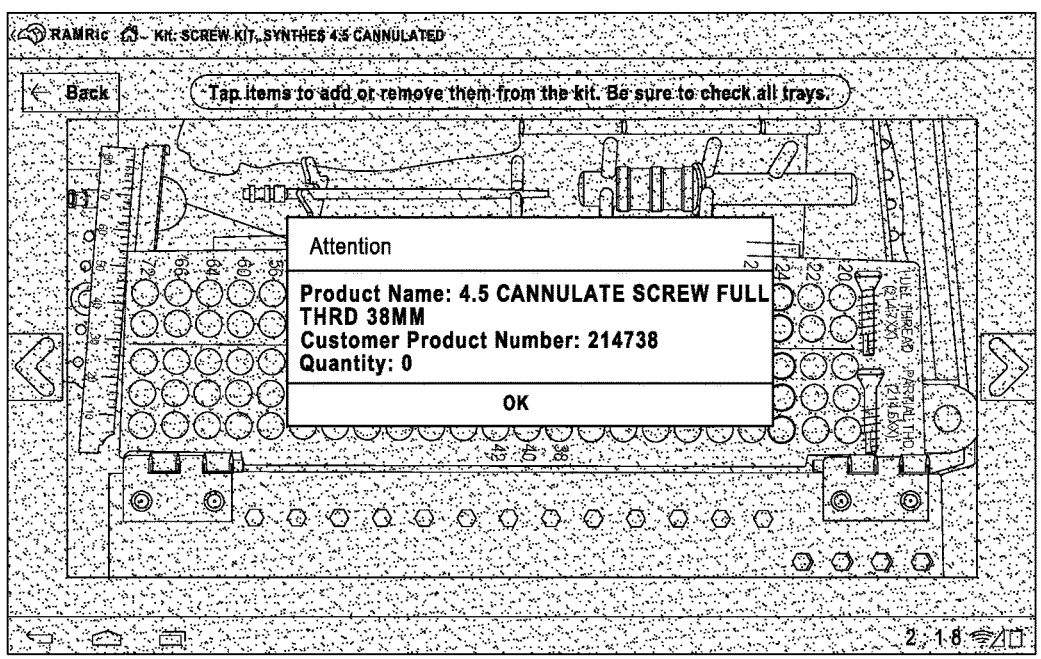

FIG. 36 is an example of a confirmation page in an embodiment of the present invention. When a user has selected items by, for example, touching them on the visual display on the product, the user is then presented with a confirmation regarding which item was selected.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for facilitating a method for managing inventory, the method comprising:
   obtaining, by a processor, a signal of decodable indicia;
   decoding, by the processor, the signal of decodable indicia to access decoded data, wherein the decoded data comprises information identifying an object, wherein the object comprises a plurality of items;
   based on the information identifying the object, obtaining, by the processor, from a memory, a visual representation of a first portion of the object, wherein the first portion of the object comprises a first subset of the plurality of the items, and wherein the visual representation comprises a plurality of regions and each region represents an item of the first subset;
   displaying, by the processor, the visual representation on a client;
   obtaining, by the processor, a designation of at least one region of the plurality of regions;
   based on obtaining the designation, updating the visual representation on the client to differentiate the at least one region of the plurality of regions from other regions of the plurality of regions, wherein the updating comprises a visual differentiation; and
   based on obtaining the designation, generating an order request for an item represented by the at least one of the plurality of regions.

2. The method of claim 1, further comprising:
   obtaining, by the processor, from the memory, a visual representation of a second portion of the object, wherein the visual representation of the second portion is divided into a plurality of regions and each region represents an item of a second subset of the plurality of the items, and wherein items comprising the first subset do not comprise the second subset;
   displaying, by the processor, the visual representation of the second portion on the client;
   obtaining, by the processor, a second designation, the second designation comprising a selection of at least one of the plurality of regions of the visual representation of the second portion; and
   based on obtaining the second designation, updating the order request to include a request for an item represented by the at least one of the plurality of regions of the visual representation of the second portion.

3. The method of claim 1, wherein the visual representation of the portion of the object comprises an image of the first portion of the object.

4. The method of claim 1, wherein the visual representation of the first portion of the object comprises a plurality of images of the object, and wherein the displaying comprises separately displaying each of the plurality of images of the object on the client.

5. The method of claim 4, wherein the object is a kit and each image of the plurality of images represents a layer of the kit.

6. The method of claim 1, wherein the object is a kit and the first portion of the object is a tray in the kit.

7. The method of claim 1, further comprising:
   transmitting, by the processor, the order request to an inventory ordering resource, wherein based on receiving the order request, the inventory ordering resource places a respective order.

8. A computer program product for managing inventory, the computer program product comprising:

a computer readable storage medium readable by a processor and storing instructions for execution by the processing circuit for performing a method comprising:

obtaining, by a processor, a signal of decodable indicia;

decoding, by the processor, the signal of decodable indicia to access decoded data, wherein the decoded data comprises information identifying an object, wherein the object comprises a plurality of items;

based on the information identifying the object, obtaining, by the processor, from a memory, a visual representation of a first portion of the object, wherein the first portion of the object comprises a first subset of the plurality of the items, and wherein the visual representation comprises a plurality of regions and each region represents an item of the first subset;

displaying, by the processor, the visual representation on a client;

obtaining, by the processor, a designation of at least one region of the plurality of regions;

based on obtaining the designation, updating the visual representation on the client to differentiate the at least one region of the plurality of regions from other regions of the plurality of regions, wherein the updating comprises a visual differentiation; and based on obtaining the designation, generating an order request for an item represented by the at least one of the plurality of regions.

9. The computer program product of claim 8, further comprising:

obtaining, by the processor, from the memory, a visual representation of a second portion of the object, wherein the visual representation of the second portion is divided into a plurality of regions and each region represents an item of a second subset of the plurality of the items, and wherein items comprising the first subset do not comprise the second subset;

displaying, by the processor, the visual representation of the second portion on the client;

obtaining, by the processor, a second designation, the second designation comprising a selection of at least one region of the plurality of regions of the visual representation of the second portion; and based on obtaining the second designation, updating the order request to include a request for an item represented by the at least one region of the plurality of regions of the visual representation of the second portion.

10. The computer program product of claim 9, wherein the visual representation of the first portion of the object comprises a plurality of images of the object and wherein the displaying comprises separately displaying each of the plurality of images of the object on the client.

11. The computer program product of claim 8, wherein the visual representation of the first portion of the object comprises an image of the first portion of the object.

12. The computer program product of claim 8, wherein the object is a kit and the first portion of the object is a tray in the kit.

13. A computer system for managing inventory, the computer system comprising:

a memory;

an encoded information reading terminal; and a processor in communications with the memory and the encoded information reading terminal, wherein the computer system is configured to perform a method, said method comprising:

obtaining, by the processor, a signal of decodable indicia;

decoding, by the processor, the signal of decodable indicia to access decoded data, wherein the decoded data comprises information identifying an object, wherein the object comprises a plurality of items;

based on the information identifying the object, obtaining, by the processor, from a memory, a visual representation of a first portion of the object, wherein the first portion of the object comprises a first subset of the plurality of the items, and wherein the visual representation comprises a plurality of regions and each region represents an item of the first subset;

displaying, by the processor, the visual representation on a client;

obtaining, by the processor, a designation of at least one region of the plurality of regions;

based on obtaining the designation, updating the visual representation on the client to differentiate the at least one region of the plurality of regions from other regions of the plurality of regions, wherein the updating comprises a visual differentiation; and based on obtaining the designation, generating an order request for an item represented by the at least one of the plurality of regions.

14. The computer system of claim 13, further comprising:

obtaining, by the processor, from the memory, a visual representation of a second portion of the object, wherein the visual representation of the second portion is divided into a plurality of regions and each region represents an item of a second subset of the plurality of the items, and wherein items comprising the first subset do not comprise the second subset;

displaying, by the processor, the visual representation of the second portion on the client;

obtaining, by the processor, a second designation, the second designation comprising a selection of at least one region of the plurality of regions of the visual representation of the second portion; and based on obtaining the second designation, updating the order request to include a request for an item represented by the at least one region of the plurality of regions of the visual representation of the second portion.

15. The computer system of claim 13, wherein the visual representation of the first portion of the object comprises an image of the first portion of the object.

16. The computer system of claim 13, wherein the visual representation of the first portion of the object comprises a plurality of images of the object and wherein the displaying comprises separately displaying each of the plurality of images of the object on the client.

17. The computer system of claim 13, wherein the object is a kit and the first portion of the object is a tray in the kit.

* * * * *